United States Patent
Yoshida et al.

(10) Patent No.: US 10,025,456 B2
(45) Date of Patent: Jul. 17, 2018

(54) DISPLAY CONTROL DEVICE, DISPLAY CONTROL METHOD, AND RECORDING MEDIUM

(71) Applicant: SONY CORPORATION, Tokyo (JP)

(72) Inventors: Ryo Yoshida, Kanagawa (JP); Takayuki Miura, Chiba (JP)

(73) Assignee: SONY CORPORATION, Minato-Ku, Tokyo (JP)

( * ) Notice: Subject to any disclaimer, the term of this patent is extended or adjusted under 35 U.S.C. 154(b) by 223 days.

(21) Appl. No.: 14/654,475

(22) PCT Filed: Oct. 1, 2013

(86) PCT No.: PCT/JP2013/005858
§ 371 (c)(1),
(2) Date: Jun. 19, 2015

(87) PCT Pub. No.: WO2014/103108
PCT Pub. Date: Jul. 3, 2014

(65) Prior Publication Data
US 2015/0346951 A1 Dec. 3, 2015

(30) Foreign Application Priority Data
Dec. 26, 2012 (JP) .................................. 2012-282308

(51) Int. Cl.
*G06F 3/0481* (2013.01)
*G06F 3/0484* (2013.01)
(Continued)

(52) U.S. Cl.
CPC ........ *G06F 3/04817* (2013.01); *G06F 3/0488* (2013.01); *G06F 3/04842* (2013.01); *G06F 17/30274* (2013.01)

(58) Field of Classification Search
CPC . G06F 3/04817; G06F 3/04842; G06F 3/0488
See application file for complete search history.

(56) References Cited

U.S. PATENT DOCUMENTS 6,690,391 B1 * 2/2004 Proehl .................. G06F 3/0362
715/720
2002/0080195 A1 * 6/2002 Carlson ................. G06F 3/0482
715/853

(Continued)

FOREIGN PATENT DOCUMENTS

| EP | 1511040 A1 | 3/2005 |
| JP | 2012-133525 A | 7/2012 |
| WO | 01/09707 A1 | 2/2001 |

*Primary Examiner* — Anil Bhargava
(74) *Attorney, Agent, or Firm* — Chip Law Group

(57) ABSTRACT

An information processing system switches to a first selected content that is included in a first content group based on a first switching operation. The first content group is oriented in a first direction. The system then switches from the first selected content to a second selected content in a second content group based on a second switching operation. The second content group is oriented in a second direction. The first content group includes content grouped according to a first standard, and the second content group includes content grouped according to a second standard that is different from the first standard, and the first selected content satisfies both the first standard and the second standard.

20 Claims, 17 Drawing Sheets

(51) Int. Cl.
*G06F 3/0488* (2013.01)
*G06F 17/30* (2006.01)

(56) References Cited

U.S. PATENT DOCUMENTS

| | | | |
|---|---|---|---|
| 2003/0001898 A1* | 1/2003 | Bernhardson | G06F 3/0482 715/786 |
| 2003/0095149 A1 | 5/2003 | Fredriksson | |
| 2003/0174906 A1* | 9/2003 | Sekiguchi | G06F 17/3025 382/305 |
| 2004/0233238 A1* | 11/2004 | Lahdesmaki | G06F 3/0482 715/810 |
| 2005/0257166 A1* | 11/2005 | Tu | G06F 3/0485 715/787 |
| 2007/0101364 A1* | 5/2007 | Morita | G06F 3/04817 725/38 |
| 2009/0080698 A1* | 3/2009 | Mihara | G06F 17/30784 382/103 |
| 2009/0234476 A1* | 9/2009 | Yoshida | G06F 17/30035 700/94 |
| 2013/0014150 A1* | 1/2013 | Seo | H04N 21/44222 725/14 |

* cited by examiner

[Fig. 1]
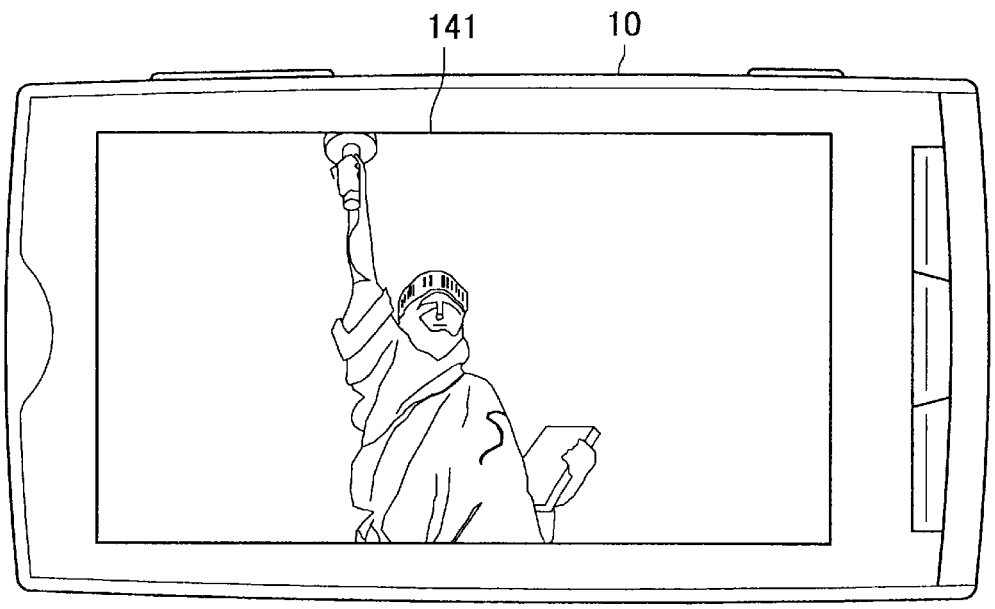

[Fig. 2]
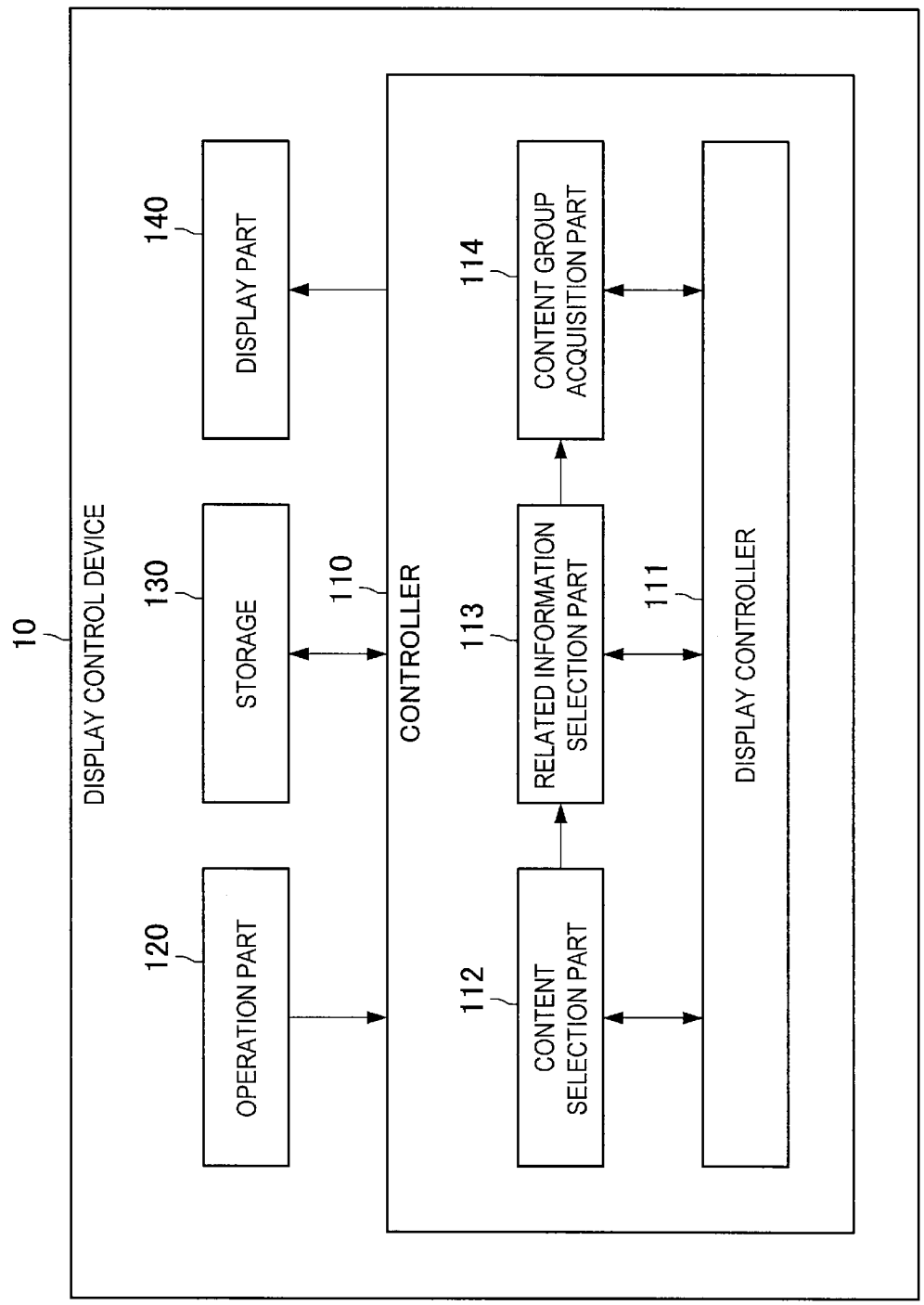

[Fig. 3]
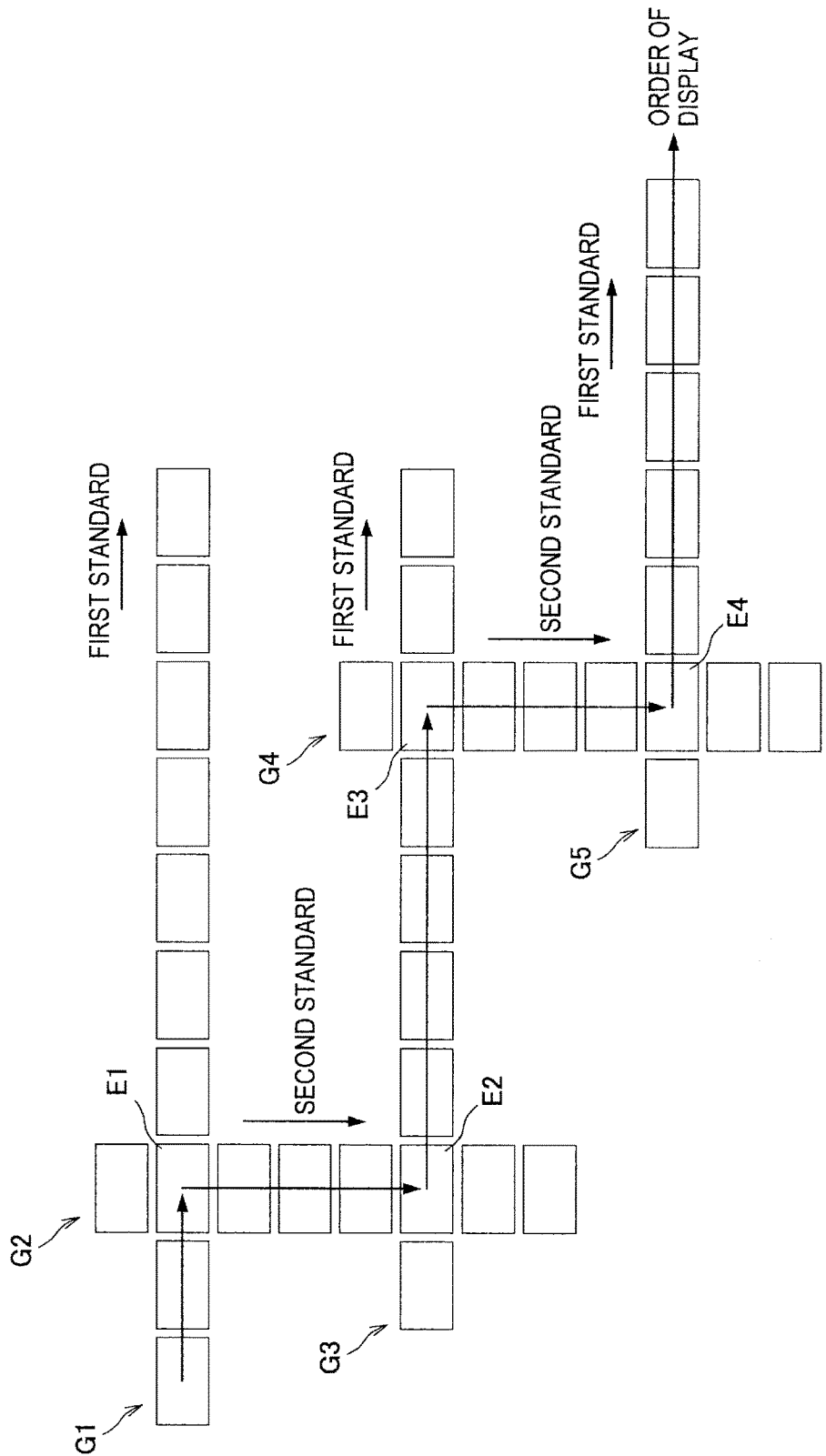

[Fig. 4]
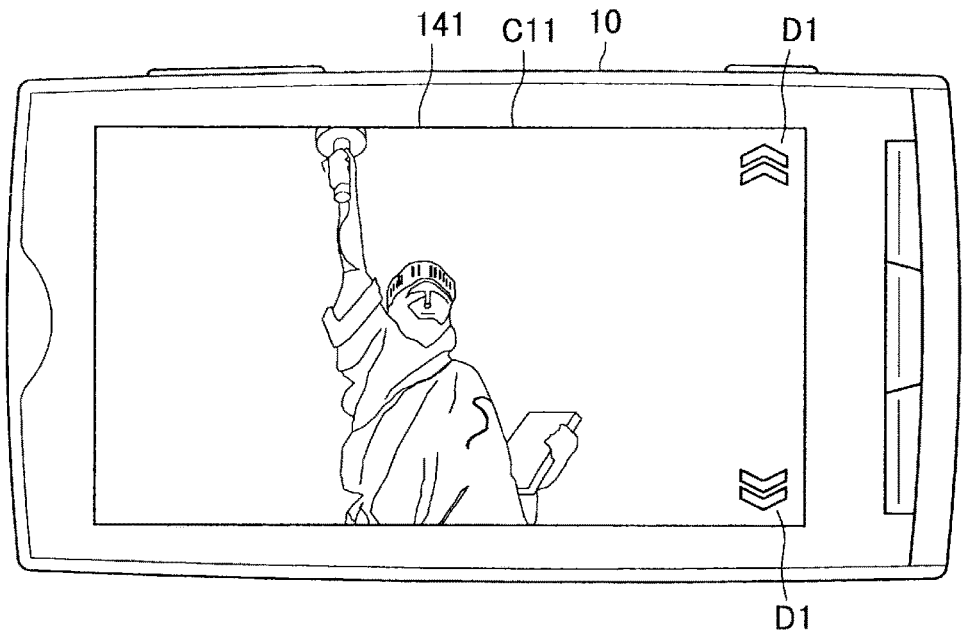
[Fig. 5]
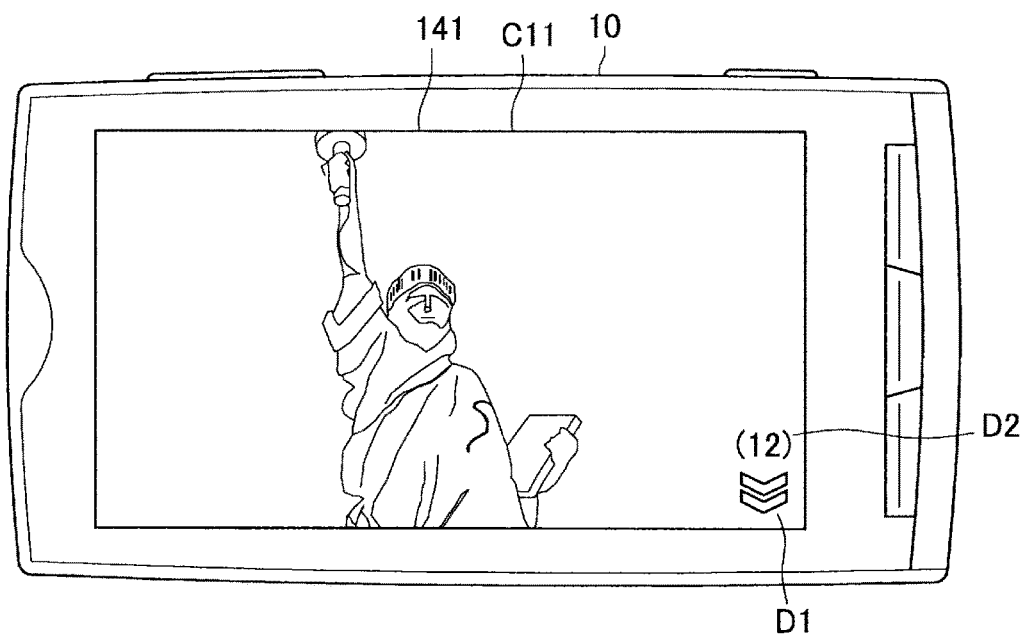

[Fig. 6]
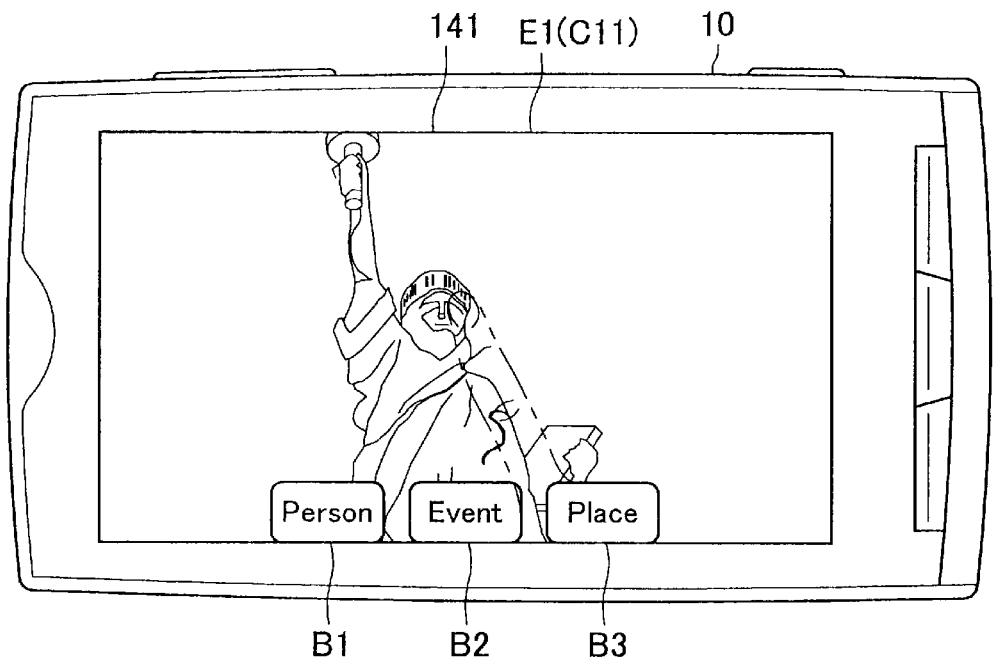
[Fig. 7]
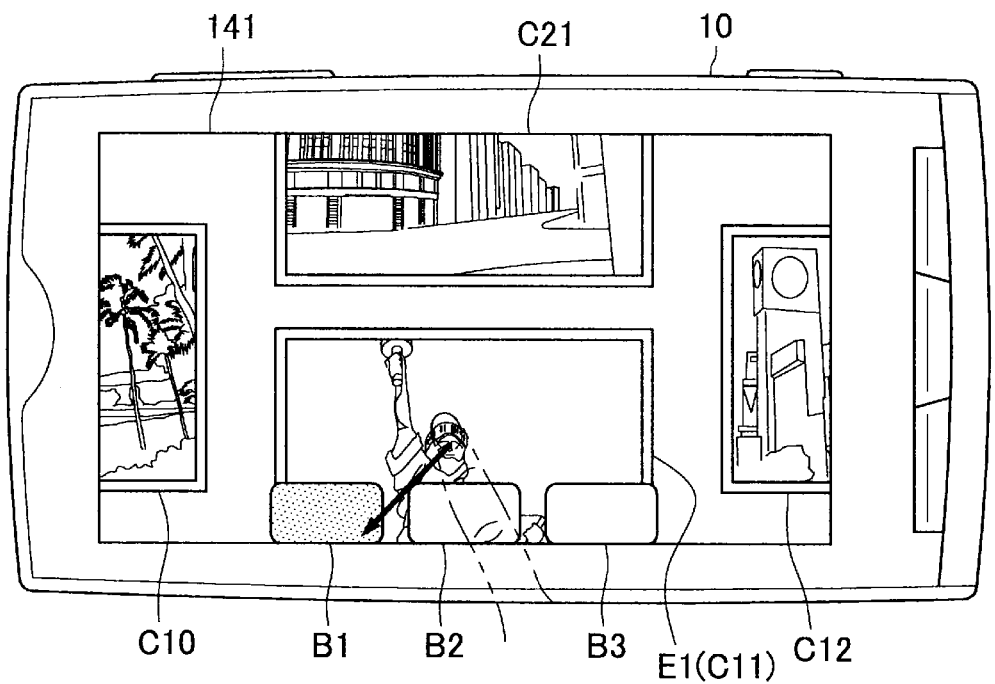

[Fig. 8]
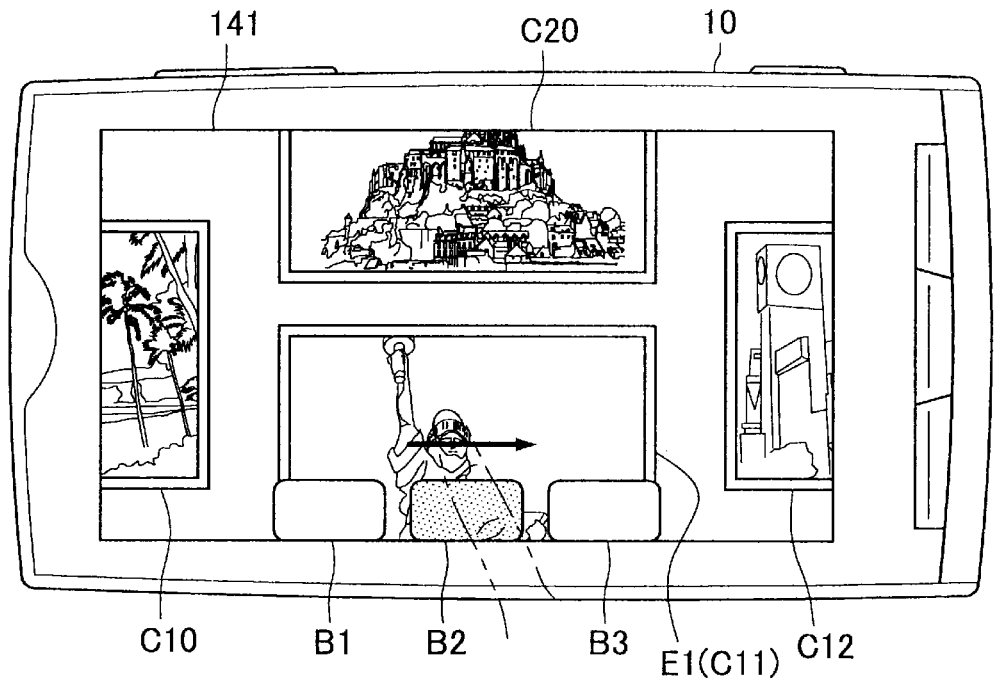
[Fig. 9]
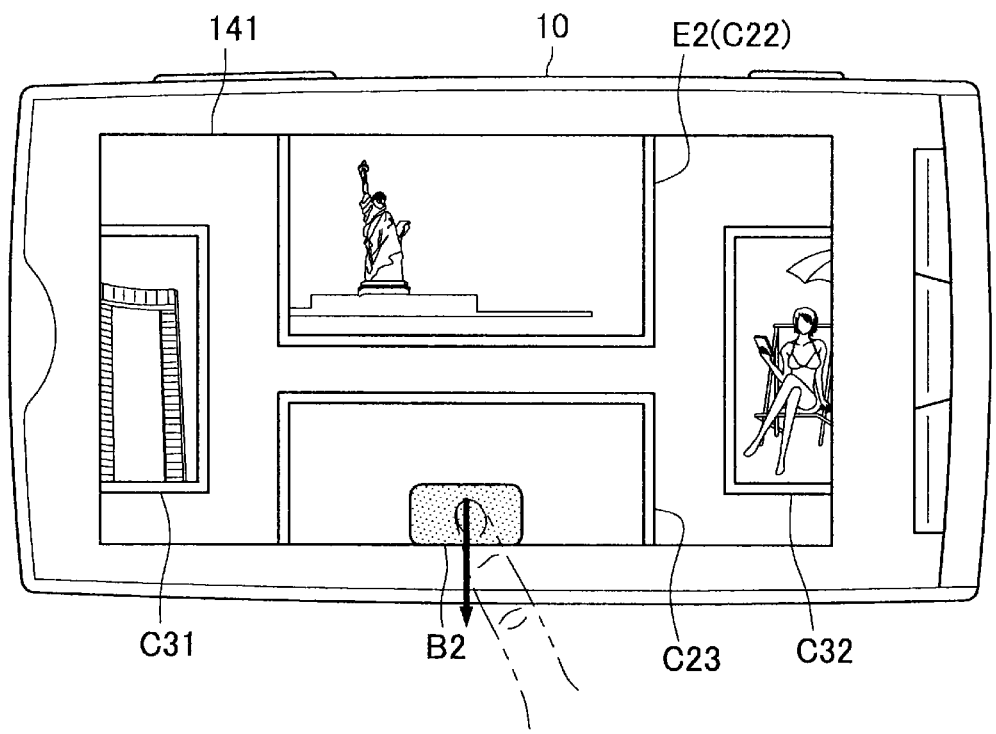

[Fig. 10]
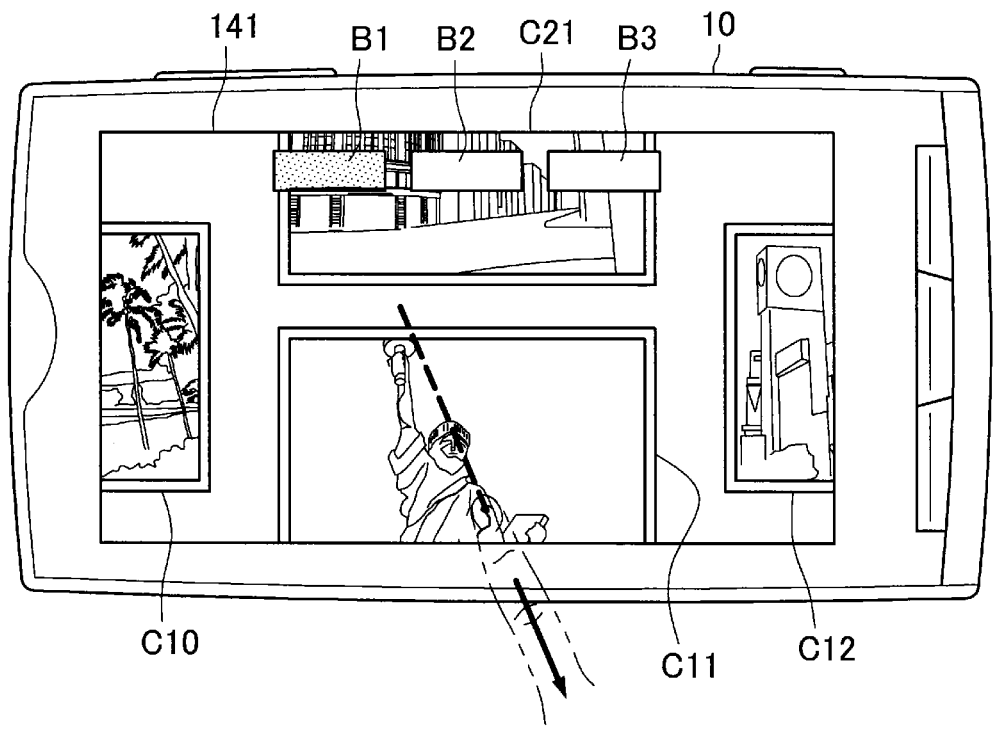
[Fig. 11]
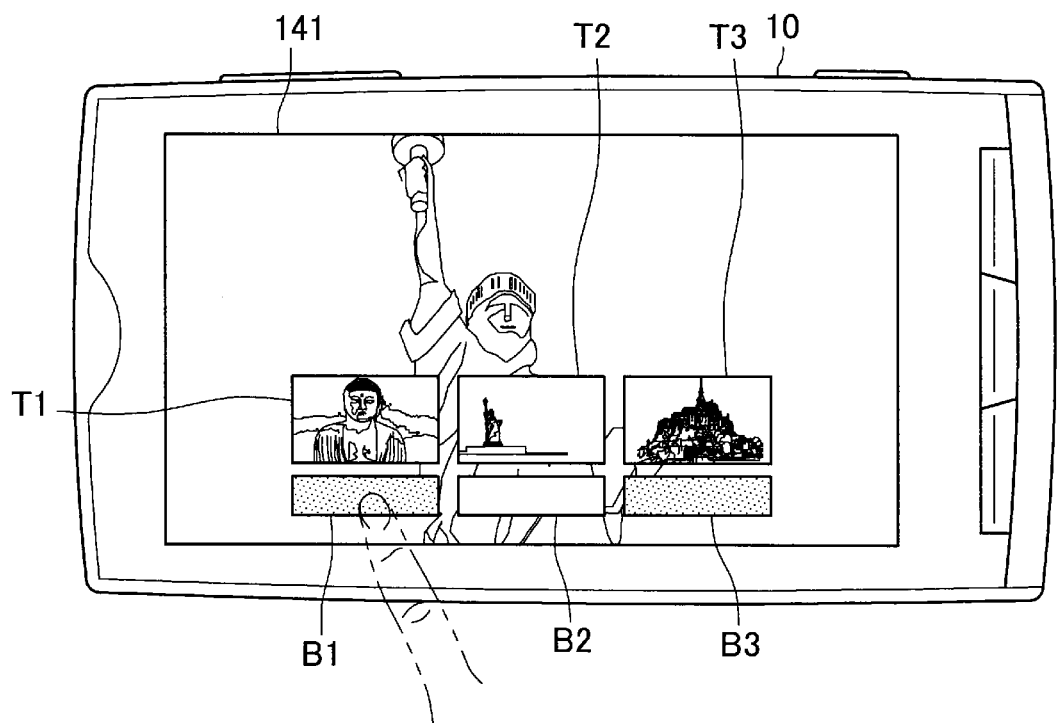

[Fig. 12]
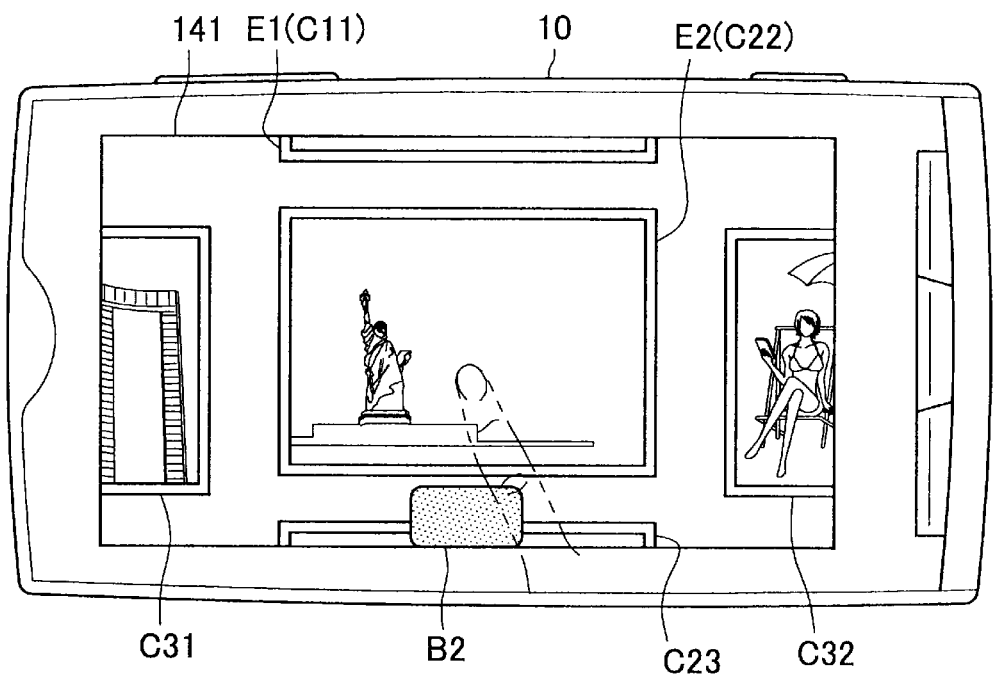
[Fig. 13]
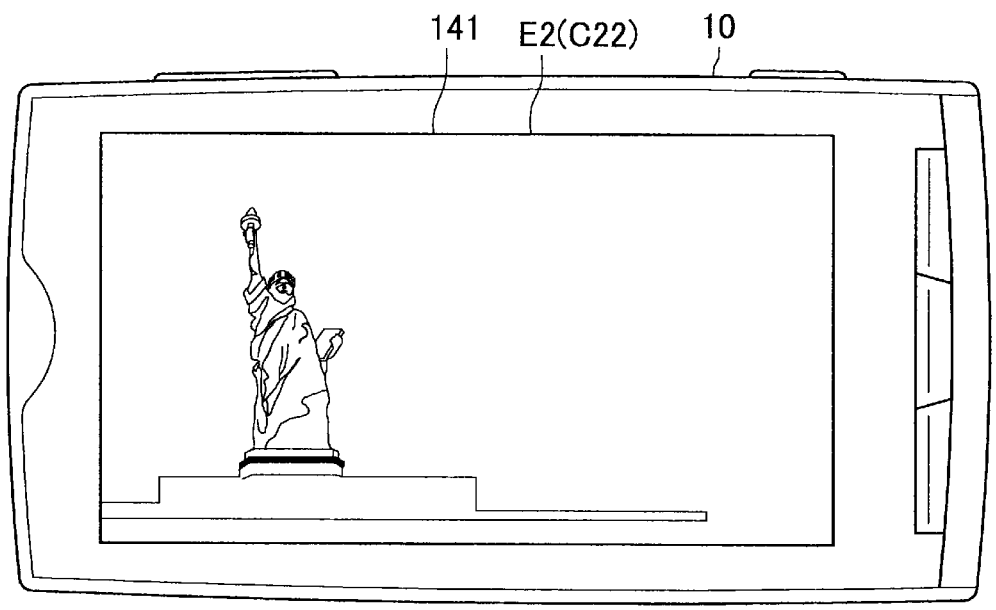

[Fig. 14]
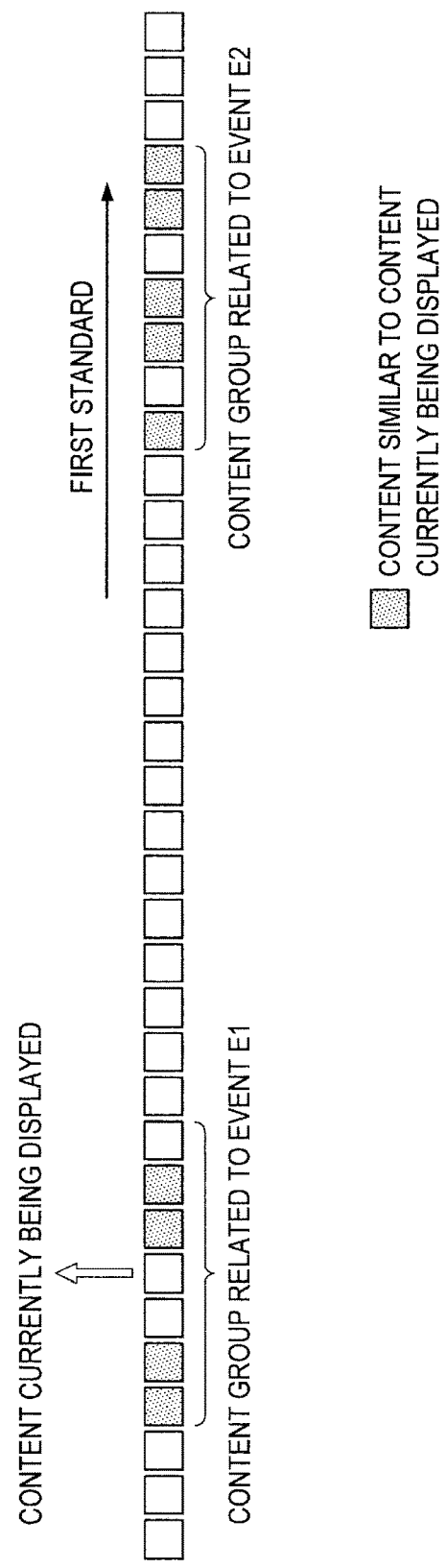

[Fig. 15]
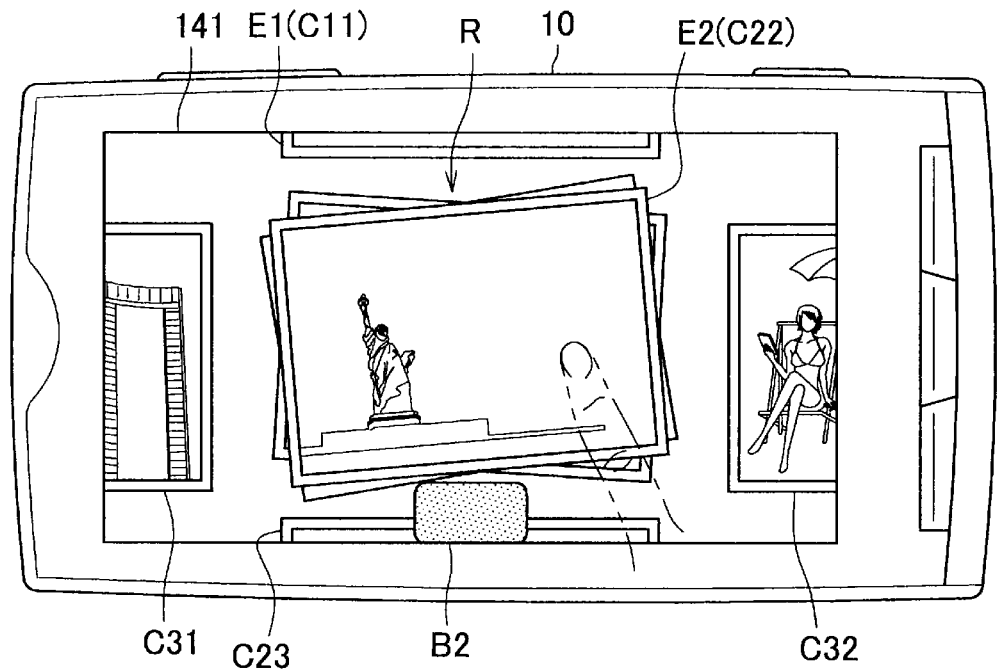
[Fig. 16]
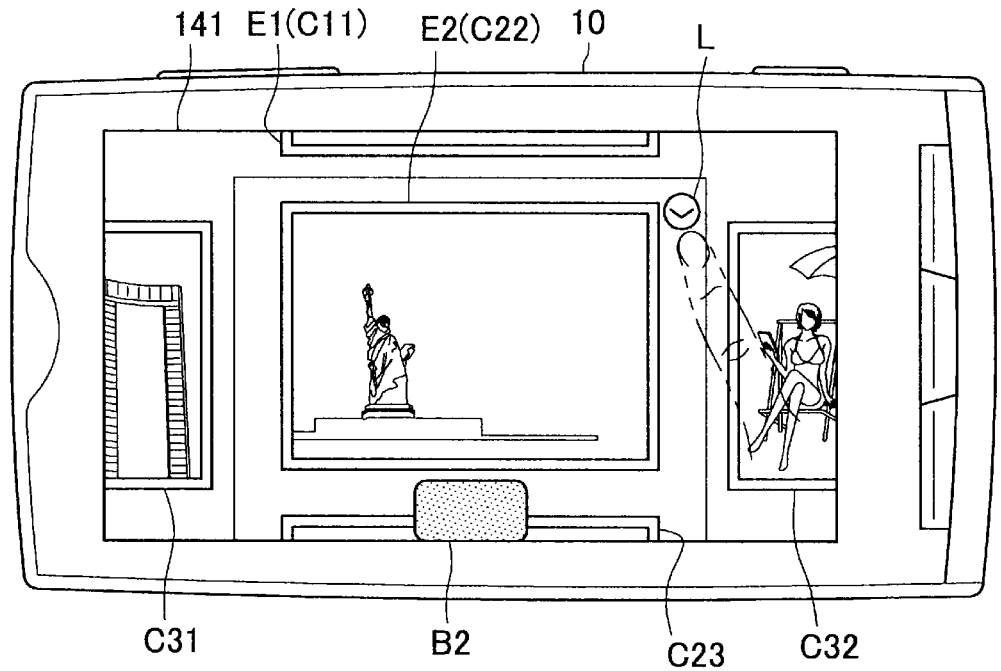

[Fig. 17]
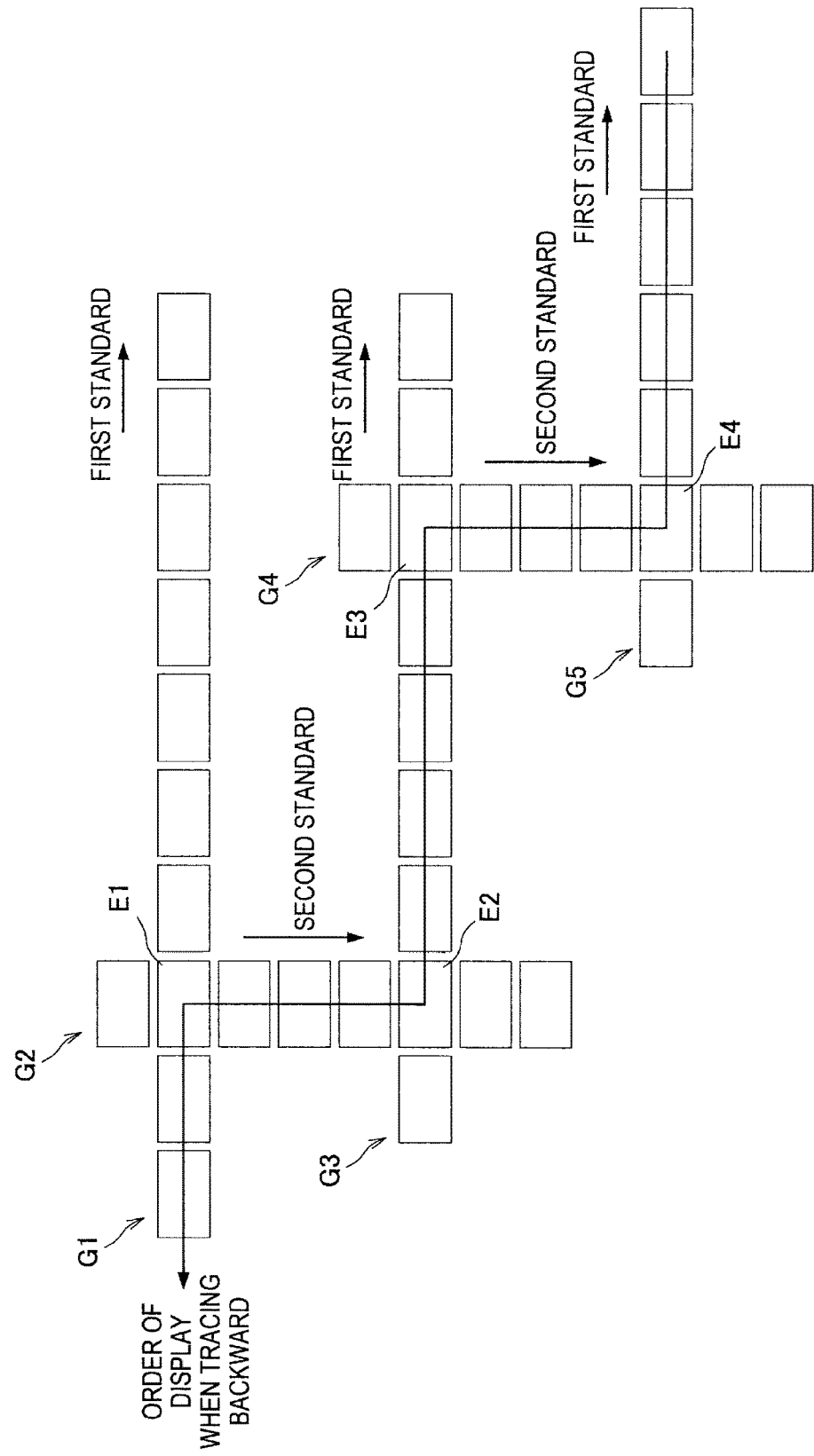

[Fig. 18]
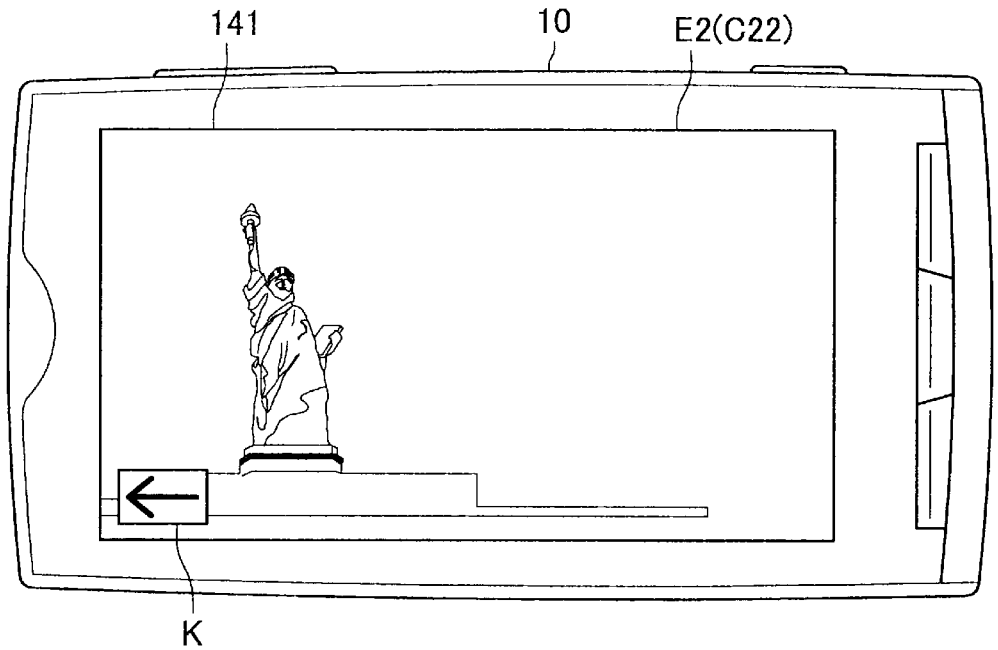
[Fig. 19]
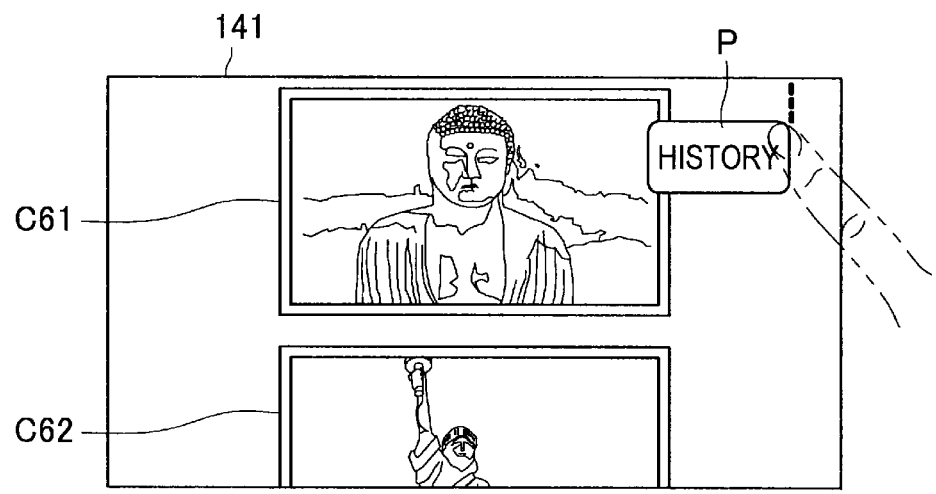

[Fig. 20]
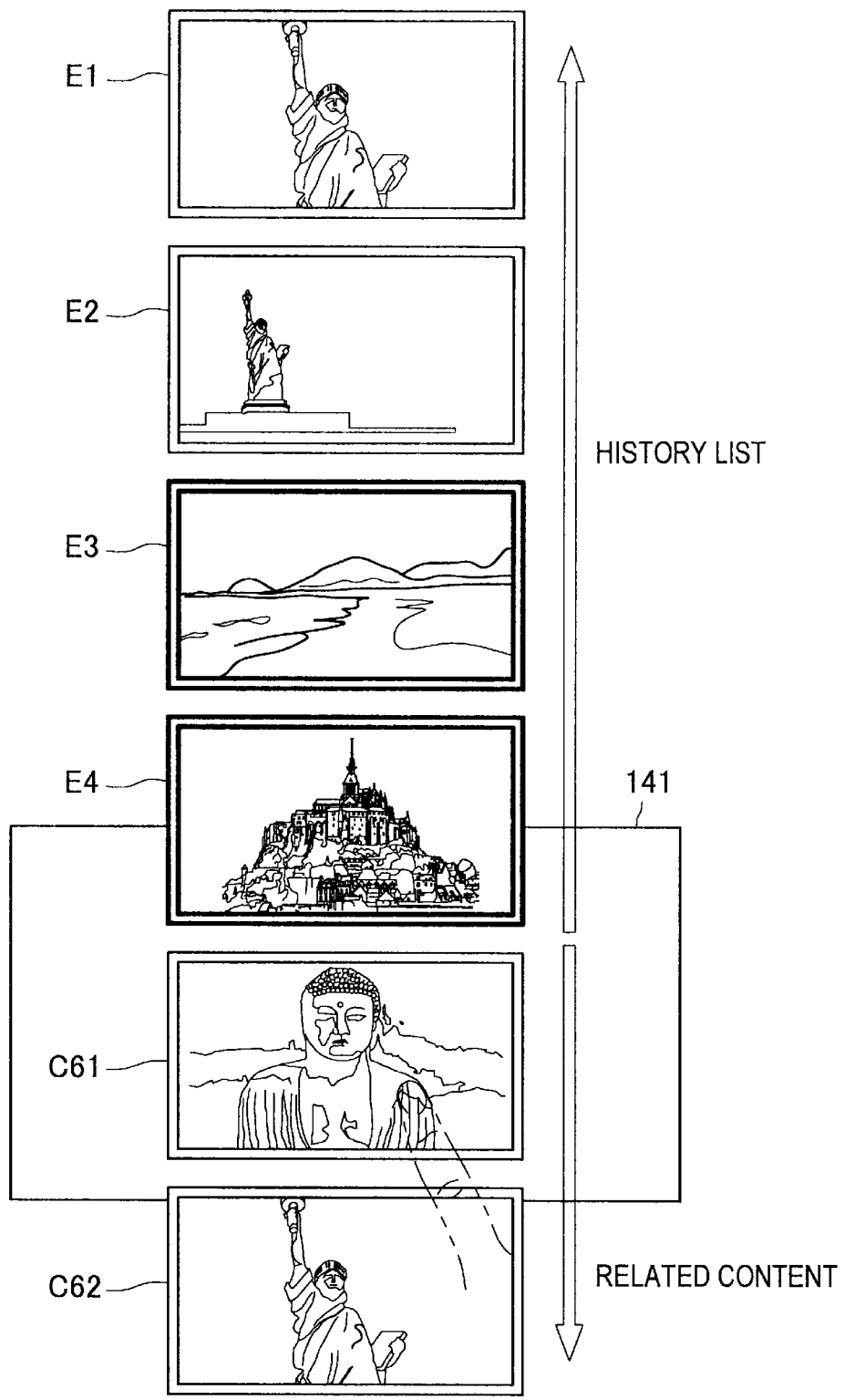

[Fig. 21]

[Fig. 22]
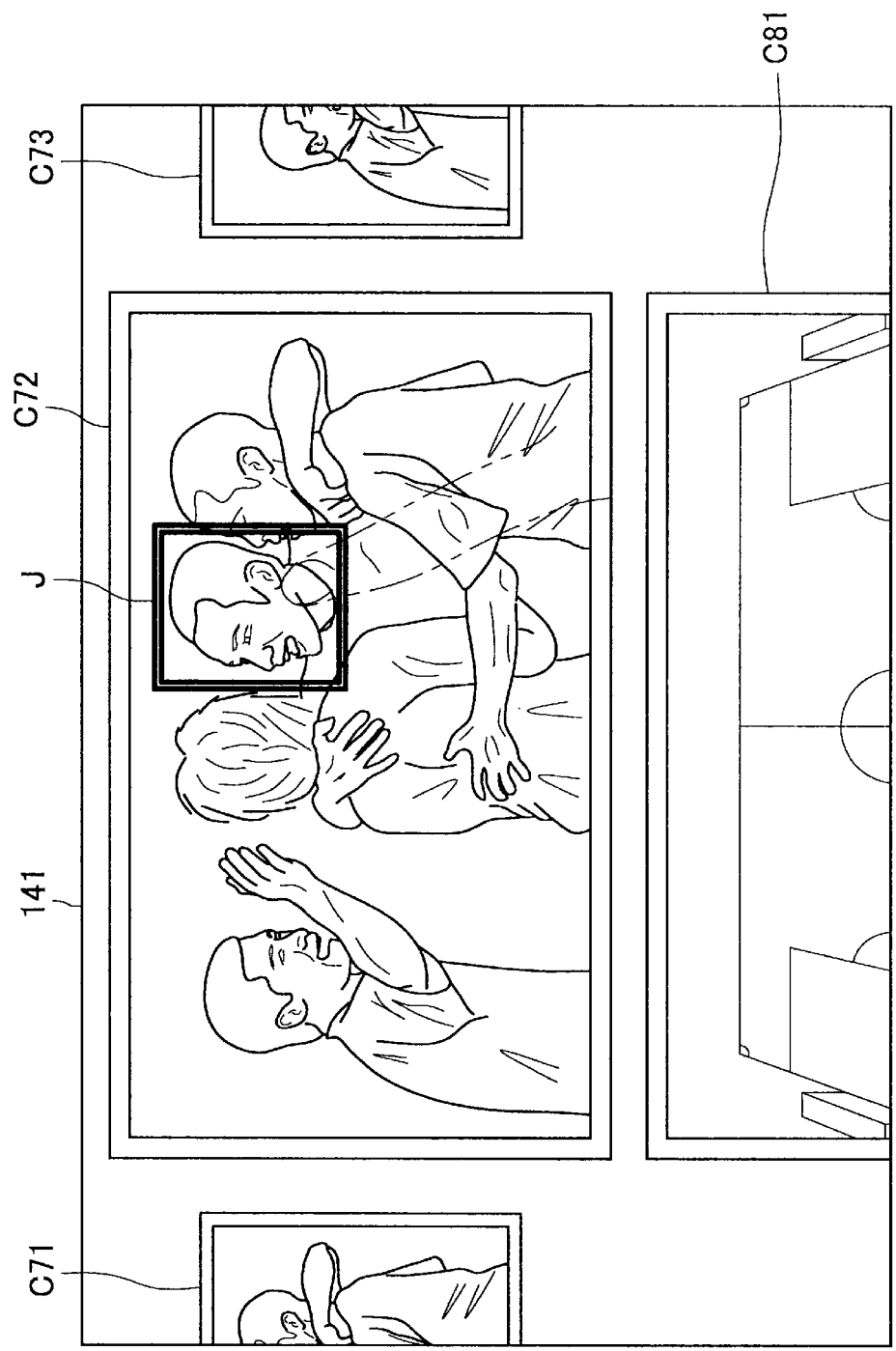

[Fig. 23]
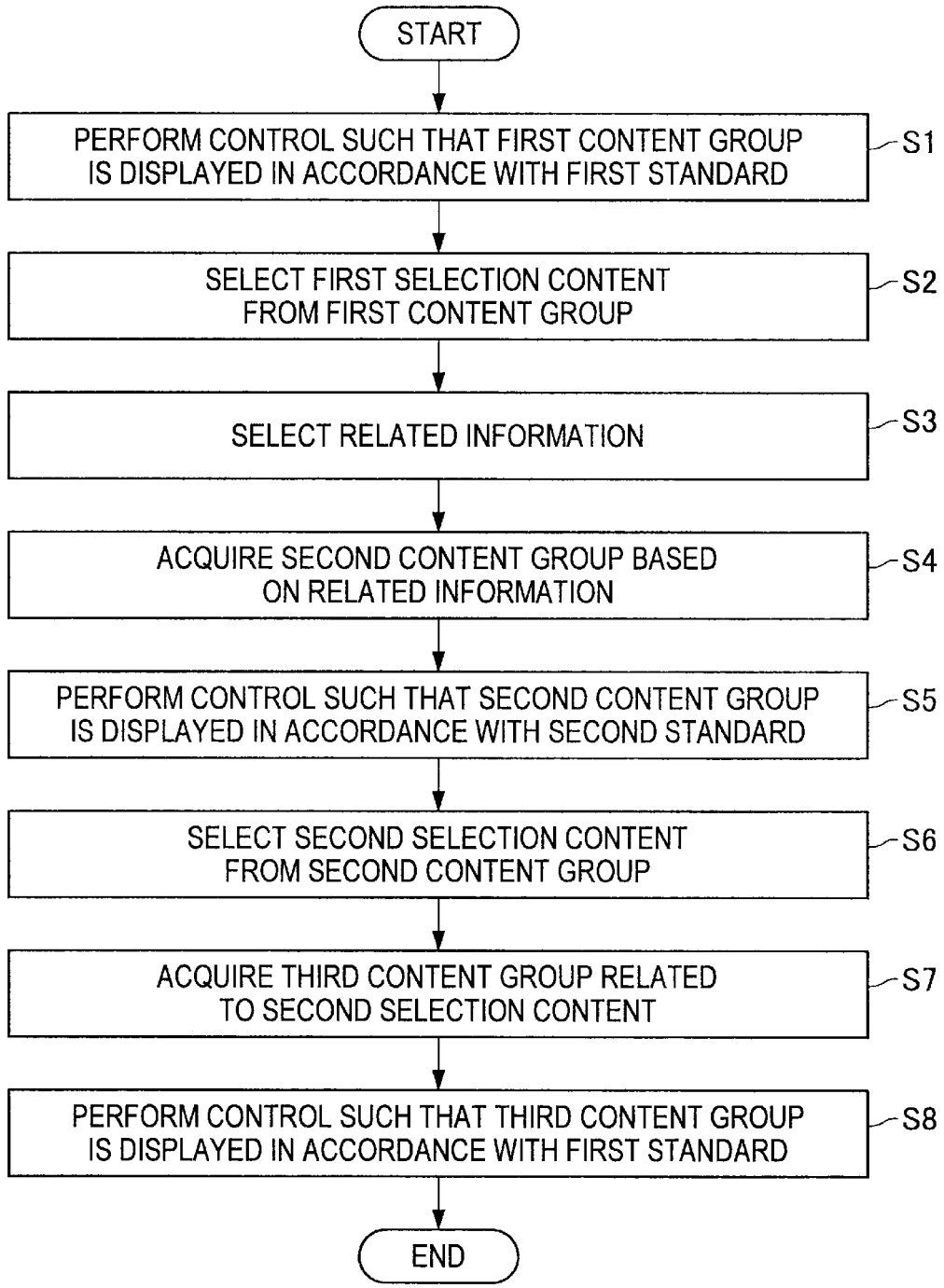

[Fig. 24]
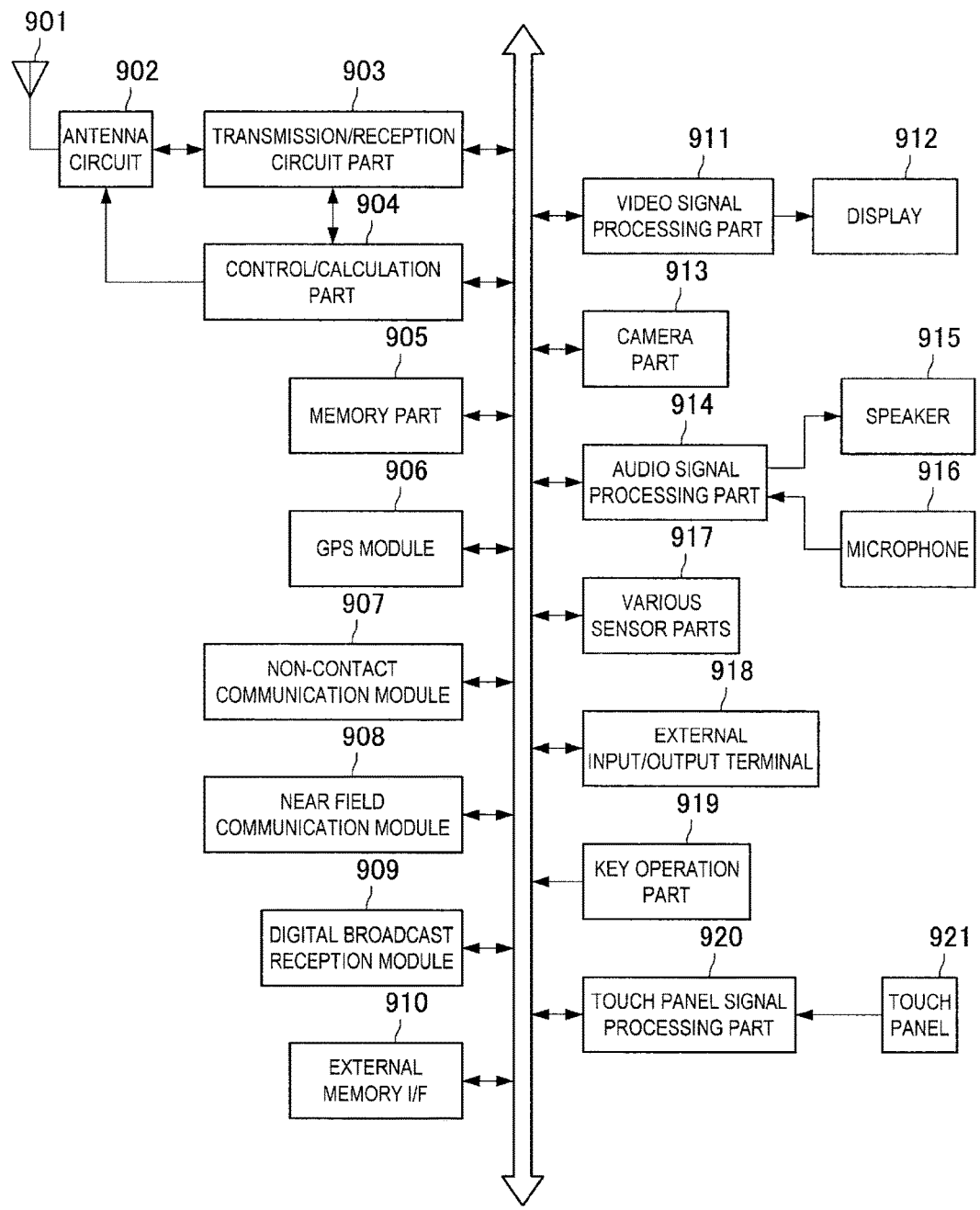

DISPLAY CONTROL DEVICE, DISPLAY CONTROL METHOD, AND RECORDING MEDIUM

TECHNICAL FIELD

The present disclosure relates to a display control device, a display control method, and a recording medium.

The present disclosure contains subject matter related to that disclosed in Japanese Priority Patent Application JP 2012-282308 filed in the Japan Patent Office on Dec. 26, 2012, the entire content of which is hereby incorporated by reference.

BACKGROUND ART

In recent years, the number of pieces of content handled by users has been increased with the developments in communication technology and increase in storage capacities of recording media. Accordingly, various technologies have been disclosed for viewing content group with a simple operation. For example, a technology is disclosed (for example, see PTL 1) for scroll-displaying pieces of content in a content group in predetermined order corresponding to a user's proximity operation direction on a display part.

According to such a technology, since the pieces of content in the content group are scroll-displayed in one direction of a screen in predetermined order corresponding to the proximity operation direction, the content group can be viewed with a simple operation.

CITATION LIST

Patent Literature

[PTL 1]
JP 2012-133525A

SUMMARY

Technical Problem

However, when pieces of content in the content group are only scroll-displayed in one direction of a screen in predetermined order, variations in sequentially displayed pieces of content in the content group is poor. Accordingly, such a technology is not sufficient for allowing a user to view the content group and entertaining the user at the same time. In light of the foregoing, it is desirable to provide a technology for allowing a user to view the content group and further entertaining the user at the same time.

Solution to Problem

In a first aspect, an information processing system includes a central processing unit that switches to a first selected content included in a first content group based on a first switching operation, where the first content group is oriented in a first direction. The system also switches from the first selected content to a second selected content in a second content group based on a second switching operation, where the second content group is oriented in a second direction. The first content group includes content grouped according to a first standard, and the second content group includes content grouped according to a second standard different from the first standard, and the first selected content satisfies both the first standard and the second standard.

In another aspect, an information processing method includes switching to a first selected content included in a first content group based on a first switching operation, where the first content group is oriented in a first direction. The method also includes switching from the first selected content to a second selected content in a second content group based on a second switching operation, where the second content group is oriented in a second direction. The first content group includes content grouped according to a first standard, and the second content group includes content grouped according to a second standard different from the first standard, and the first selected content satisfies both the first standard and the second standard.

In a further aspect, a non-transitory computer-readable medium encoded with computer-readable instructions that when executed by a computer cause the computer to perform a method. The method includes switching to a first selected content included in a first content group based on a first switching operation, where the first content group is oriented in a first direction, and switching from the first selected content to a second selected content in a second content group based on a second switching operation, where the second content group is oriented in a second direction. The first content group includes content grouped according to a first standard, and the second content group includes content grouped according to a second standard different from the first standard, and the first selected content satisfies both the first standard and the second standard.

Advantageous Effects of Invention

According to one or more of embodiments described above, it is possible to allow a user to view a content group and further entertain the user at the same time.

BRIEF DESCRIPTION OF DRAWINGS

FIG. 1 is a diagram showing an appearance example of a display control device according to an embodiment of the present disclosure.

FIG. 2 is a diagram showing a functional configuration example of a display control device according to an embodiment of the present disclosure.

FIG. 3 is a diagram illustrating an overview of functions of a display control device according to an embodiment of the present disclosure.

FIG. 4 is a diagram showing a first example of a display indicating that there is related content.

FIG. 5 is a diagram showing a second example of a display indicating that there is related content.

FIG. 6 is a diagram showing a first example of a screen for selecting related information.

FIG. 7 is a diagram showing an example of a technique for selecting related information on the screen shown in FIG. 6.

FIG. 8 is a diagram showing an example of a technique for selecting related information on the screen shown in FIG. 6.

FIG. 9 is a diagram showing an example of a screen in which a display is controlled after related information is selected.

FIG. 10 is a diagram showing a second example of a screen for selecting related information.

FIG. 11 is a diagram showing a third example of a screen for selecting related information.

FIG. 12 is a diagram showing an example of a technique for returning a display state to a normal display state.

FIG. 13 is a diagram showing an example of a screen whose display is controlled after a display state is returned to a normal display state.

FIG. 14 is a diagram illustrating display restriction on pieces of similar content.

FIG. 15 is a diagram showing an example of a screen in which display restriction is imposed on pieces of similar content.

FIG. 16 is a diagram showing an example of a screen in which display restriction on pieces of similar content is released.

FIG. 17 is a diagram illustrating redisplay of content that was displayed a predetermined number of pieces of content before currently displayed content.

FIG. 18 is a diagram illustrating an example of a screen for redisplay of content that was displayed a predetermined number of pieces of content before currently displayed content.

FIG. 19 is a diagram illustrating a first example of a screen for redisplay of selection content.

FIG. 20 is a diagram illustrating a second example of a screen for redisplay of selection content.

FIG. 21 is a diagram illustrating a third example of a screen for redisplay of selection content.

FIG. 22 is a diagram showing an example of a screen for selecting an item recognized from selection content.

FIG. 23 is a diagram showing an example of operation performed by a display control device according to an embodiment of the present disclosure.

FIG. 24 is a diagram showing a hardware configuration example of a display control device according to an embodiment of the present disclosure.

DESCRIPTION OF EMBODIMENTS

It should be understood by those skilled in the art that various modifications, combinations, sub-combinations and alterations may occur depending on design requirements and other factors insofar as they are within the scope of the appended claims or the equivalents thereof.

Further, in this specification and the appended drawings, there are some cases where multiple structural elements that have substantially the same function and structure are distinguished from one another by being denoted with different alphabets or numbers after the same reference numeral. Note that, in the case where it is not necessary to distinguish the multiple structural elements that have substantially the same function and structure from one another, the multiple structural elements are denoted with the same reference numeral only.

Further, the "detailed description of the embodiments" will be described in the following order.

1. Embodiment 1-1. Appearance example of display control device 1-2. Functional configuration example of display control device 1-3. Overview of functions of display control device 1-4. Detail of functions of display control device 1-5. Display restriction on pieces of similar content 1-6. Redisplay of content 1-7. Selection of item within content 1-8. Example of operation performed by display control device 1-9. Hardware configuration example 2. Conclusion

1. Embodiment

First, an embodiment of the present disclosure will be described.

(1-1. Appearance Example of Display Control Device)

First, an appearance example of a display control device 10 according to an embodiment of the present disclosure will be described. FIG. 1 is a diagram showing an appearance example of the display control device 10 according to an embodiment of the present disclosure. For example, the display control device 10 is capable of performing control such that content is displayed on a display screen 141.

Here, the type of the content is not particularly limited. For example, the content may be image data, text data, or other types of content. The image data may be image data of a still image, or may be image data of a moving image. In the example shown in FIG. 1, the display control device 10 includes the display screen 141. However, the display screen 141 may be provided outside the display control device 10, or may be connected to the display control device 10 via a network.

Here, for example, in a technology for scroll-displaying pieces of content in the content group in one direction of a screen in predetermined order, variations in sequentially displayed pieces of content in the content group is poor. Accordingly, such a technology is not sufficient for allowing a user to view the content group and entertaining the user at the same time. Accordingly, the present specification suggests a technology that can allow the user to view the content group and further entertain the user at the same time.

Heretofore, the appearance example of the display control device 10 according to an embodiment of the present disclosure has been described.

(1-2. Functional Configuration Example of Display Control Device)

Next, a functional configuration example of the display control device 10 according to an embodiment of the present disclosure will be described. FIG. 2 is a diagram showing a functional configuration example of the display control device 10 according to an embodiment of the present disclosure. As shown in FIG. 2, the display control device 10 includes a controller 110, an operation part 120, a storage 130, and a display part 140.

The controller 110 corresponds to a processor such as a central processing unit (CPU), for example. The controller 110 exhibits various functions of the controller 110 by executing a program stored in the storage 130 or another storage medium. For example, the controller 110 may function as an acquisition part which acquires a signal input from the operation part 120. The input signal acquired by the controller 110 includes various types of operations. The controller 110 includes a display controller 111, a content selection part 112, a related information selection part 113, and a content group acquisition part 114. The functions of the display controller 111, the content selection part 112, the related information selection part 113, and the content group acquisition part 114 will be described later.

The operation part 120 detects a user operation and outputs the user operation to the controller 110. For example, the operation part 120 generates an inputs signal based on the operation input of the user. Since the present specification assumes the case where the operation part 120 is configured from a touch panel, the user operation is input using a user's finger as an operating object. However, the operation part 120 may be configured from hardware other than the touch panel. Note that, although the operation part 120 is provided in an integrated manner with the display control device 10 in the example shown in FIG. 2, the operation part 120 may also be configured separately from the display control device 10.

The storage 130 stores a program for operating the controller 110 using a storage medium such as semiconductor memory or a hard disk. Further, for example, the storage 130 can also store various types of data (for example, various types of setting information and content) used by a program. Note that, although the storage 130 is provided in an integrated manner with the display control device 10 in the example shown in FIG. 2, the storage 130 may also be configured separately from the display control device 10.

The display part 140 displays various types of information in accordance with control performed by the display controller 111. For example, the display part 140 is configured from a liquid crystal display (LCD), an organic electroluminescence (EL) display device, and the like. Note that, although the display part 140 is provided in an integrated manner with the display control device 10 in the example shown in FIG. 2, the display part 140 may also be configured separately from the display control device 10.

Heretofore, the functional configuration example of the display control device 10 according to an embodiment of the present disclosure has been described.

(1-3. Overview of Functions of Display Control Device)

Next, an overview of functions of the display control device 10 according to an embodiment of the present disclosure will be described. FIG. 3 is a diagram illustrating an overview of functions of the display control device 10 according to an embodiment of the present disclosure. Note that, hereinafter, although a description will be mainly made of an example in which a selection operation is performed by a touch operation and a switching operation is performed by a drag operation, the selection operation and the switching operation may be realized by any operation.

As shown in FIG. 3, a content group G1 is a content group in which display order of pieces of content is determined in accordance with a first standard, and corresponds to a first content group. The first standard may be any standard. For example, the first standard may be a standard corresponding to a time associated with content (for example, content shot time or content updated time), and may be a standard that is the chronological order associated with content. The display controller 111 switches a display target to another display target in the content group G1 in response to a first switching operation indicating a first direction.

Here, as shown in FIG. 3, let us assume that first selection content E1 is selected from the content group G1. A content group G2 is a content group corresponding to related information associated with the first selection content E1, and corresponds to a second content group. The display controller 111 switches a display target to another display target in the content group G2 in response to a second switching operation indicating a second direction that is different from the first direction. When the display control is performed in this way, since pieces of content in a content group corresponding to related information associated with the first selection content E1 are sequentially displayed, it becomes possible to allow a user to view the content group and further entertain the user at the same time.

The selection of the first selection content E1 and the acquisition of the content group G2 may be performed by the controller 110, for example. More specifically, for example, the content selection part 112 may select the first selection content E1 from the content group G1 in response to a selection operation, and the content group acquisition part 114 may acquire the content group G2 based on related information associated with the first selection content E1.

Here, the related information is not particularly limited as long as the related information is information related to content. For example, the related information may be information indicating a person who shot the content, may be information indicating a position at which the content is shot, or may be information indicating an event in which the content is shot. More specifically, the content group acquisition part 114 may acquire, as the content group G2, a content group including pieces of content each associated with related information that is identical to or similar to the related information associated with the first selection content E1. The range of "similar" may be determined in advance.

A second standard may be any standard. For example, the second standard may be may be a standard different from the first standard. In this case, the display controller 111 may determine the display order of pieces of content included in the content group G2 in accordance with the second standard that is different from the first standard. When the display order is determined in this manner, it is assumed that variations in sequentially displayed pieces of content in the content groups (content group G1 and content group G2) will become richer.

For example, the second standard may be a standard that uses related information that is associated with content in advance. That is, the second standard may be a standard for determining display order in accordance with related information associated with respective pieces of content that constitute the content group G2. More specifically, the second standard may be a standard that gives priority in terms of display order to content associated with related information having higher degree of similarity with related information of the first selection content E1.

Alternatively, the second standard may also be a standard that uses an evaluation value calculated from content. That is, the second standard may be a standard for determining display order corresponding to a degree of similarity between an evaluation value calculated from the first selection content E1 and an evaluation value calculated from each of the pieces of content that constitute the content group G2. More specifically, the second standard may be a standard that that gives priority in terms of display order to content from which an evaluation value having a higher degree of similarity with the evaluation value calculated from the first selection content E1 is calculated.

The number of pieces of related information associated with content may be one, or two or more. For example, in the case where the number of pieces of related information associated with the first selection content E1 is two or more, a plurality of content groups G2 may be selected in accordance with the plurality of pieces of related information. In this case, it is assumed that there are also various types of display order for the plurality of content groups G2. The display controller 111 may determine the display order of the plurality of content groups G2 in accordance with a predetermined standard.

The predetermined standard may be a standard for determining the display order depending on the number of pieces of content that constitute each of the plurality of content groups G2. More specifically, for example, the display controller 111 may determine the display order so as to give priority in terms of display order to a content group G2 having a larger number of pieces of content. In this case, since the priority in terms of display order is given to a content group G2 having a larger number of pieces of content, the content groups can be sequentially viewed from the content group having a larger number of pieces of content.

On the other hand, for example, the display controller 111 may determine the display order so as to give priority in terms of display order to a content group G2 having a smaller number of pieces of content. In this case, since the priority in terms of display order is given to a content group G2 having a smaller number of pieces of content, the content groups can be sequentially viewed from the content group having a smaller number of pieces of content.

Next, the display controller 111 switches a display target to another display target in the content group G2 in response to the second switching operation, and switches, in response to the first switching operation, a display target to another display target in a content group G3 corresponding to related information associated with second selection content E2 selected from the content group G2. The content group G3 corresponds to a third content group. Here, the display controller 111 determines, in accordance with the first standard, display order of pieces of content included in the content group G3. In this way, the standard for determining the display order of pieces of content included in the content group G3 returns to the standard for determining the display order of pieces of content included in the content group G1.

In the same manner, for example, the display controller 111 may switch, in response to the first switching operation, a display target to another display target in the content group G3, and may switch, in response to the second switching operation, a display target to another display target in a content group G4 corresponding to related information associated with third selection content E3 selected from the content group G3. For example, the display controller 111 may determine, in accordance with the second standard, the display order of pieces of content included in the content group G4.

Further, in the same manner, the display controller 111 may switch, in response to the second switching operation, a display target to another display target in the content group G4, and may switch, in response to the first switching operation, a display target to another display target in a content group G5 corresponding to related information associated with fourth selection content E4 selected from the content group G4. For example, the display controller 111 may determine, in accordance with the first standard, the display order of pieces of content included in the content group G5. The operation after the selection of selection content from the content group G5 may be performed in the same manner.

Note that, in the example shown in FIG. 3, although each content group is arranged based on the direction of the switching operation, the switching direction is not particularly limited. Further, hereinafter, although the display controller 111 performs display control such that each content group is arranged in a lateral direction or a vertical direction on a two-dimensional basis, the direction in which each content group is arranged is not limited to the lateral direction or the vertical direction on a two-dimensional basis. For example, the display controller 111 may perform display control such that each content group is arranged diagonally on a two-dimensional basis, or may perform display control such that each content group is arranged in a predetermined direction (for example, depth direction) on a three-dimensional basis.

Heretofore, the overview of functions of the display control device 10 according to an embodiment of the present disclosure has been described.

(1-4. Detail of Functions of Display Control Device)

Next, a detail of functions of the display control device 10 according to an embodiment of the present disclosure will be described. As described above, when control is performed such that any one of the pieces of content that constitute the content group G1 is displayed, there is a case where content (hereinafter, also referred to as "related content") related to the one piece of content is present. In this case, it is assumed that if the display controller 111 performs control in a manner that a display indicating that the related content is present is displayed, convenience for a user will be increased.

FIG. 4 is a diagram showing a first example of a display indicating that there is related content. FIG. 5 is a diagram showing a second example of a display indicating that there is related content. In each of the cases shown in the respective figures, control is performed such that content C11 included in the content group G1 is displayed. Here, as shown in FIG. 4, for example, the display controller 111 may display a display D1 indicating that there is related content of the content C11. In particular, the display D1 indicates a direction of a switching operation that is necessary for switching the display target to the related content.

Further, as shown in FIG. 5, for example, the display controller 111 may display a display D2 indicating that there is related content of the content C11. In particular, the display D2 indicates the number of pieces of related content. Further, as shown in FIG. 5, the display controller 111 may perform control in a manner that the display D1 is additionally displayed. In this case, the display controller 111 may perform control in a manner that the number of pieces of related content that are present for each display D1 is displayed as the display D2.

Note that a timing at which the displays D1 and D2 are displayed is not particularly limited, the displays D1 and D2 each indicating that there is related content. For example, the displays D1 and D2 each indicating that there is related content may be displayed unconditionally while content is being displayed, may be displayed when some kind of operation (for example, proximity operation) is detected, and may be displayed when display targets are switched.

Here, as described above, although the content group G2 corresponding to related information associated with the first selection content E1 is acquired, the related information is not particularly limited as described above. For example, a case may be assumed where the related information used for acquiring the content group G2 may be selected from a plurality of pieces of related information based on a user operation. Hereinafter, an example will be described in which related information is selected from a plurality of pieces of related information based on a user operation.

FIG. 6 is a diagram showing a first example of a screen for selecting related information. As shown in FIG. 6, let us assume that the display controller 111 performs control such that the content C11 included in the content group G1 is displayed. Here, when some kind of user operation (for example, touch operation) is performed, objects corresponding to a plurality of pieces of related information, respectively, are displayed. In the example shown in FIG. 6, there are displayed "Person" as an example of an object B1, "Event" as an example of an object B2, and "Place" as an example of an object B3. Note that the number of the plurality of pieces of related information is not limited to three.

FIG. 7 and FIG. 8 are each a diagram showing an example of a technique for selecting related information on the screen shown in FIG. 6. For example, after displaying the display screen 141 shown in FIG. 6, the display controller 111 displays a display screen 141 shown in FIG. 7. The transition from the display screen 141 shown in FIG. 6 to the display screen 141 shown in FIG. 7 may take place gradually. In the display screen 141 shown in FIG. 7, in addition to the objects B1 to B3, content C10 and content C12 included in the content group G1 are displayed, the content C10 and the content C12 being pieces of content to which the display can be switched from the content C11 serving as a current display target.

Here, for example, in the case where a drag operation is performed by a user as an example of the operation for selecting related information, when there is the object B1 in the direction of the drag operation (or, when there is the object B1 in proximity to the direction of the drag operation performed by the user), the related information selection part 113 may select related information "Person" corresponding to the object B1.

In this case, the content group acquisition part 114 may acquire the content group G2 based on the related information "Person" selected by the related information selection part 113. In the display screen 141 shown in FIG. 7, among the content group G2, the content C11 serving as the current display target is represented by the first selection content E1, and content C21 to which the display can be switched from the first selection content E1 is displayed.

Next, as shown in FIG. 8, in the case where a drag operation is performed by a user, when there is the object B2 in the direction of the drag operation (or, when there is the object B2 in proximity to the direction of the drag operation performed by the user), the related information selection part 113 may select related information "Event" corresponding to the object B2.

In this case, the content group acquisition part 114 may acquire the content group G2 based on the related information "Event" selected by the related information selection part 113. In the display screen 141 shown in FIG. 8, among the content group G2, content C20 to which the display can be switched from the content C11 is displayed, the content C11 serving as the current display target. Note that the number of pieces of related information to be selected may not be one as shown in FIG. 7, and may be two or more. In this case, a content group may be acquired by "OR" search using a plurality of pieces of related information, and a content group may be acquired by "AND" search using a plurality of pieces of related information.

In this way, the selection of related information may be performed simultaneously with the switching of content of the display target, and may also be performed by a user operation in advance. Alternatively, the selection of related information may be performed automatically by an application installed in the display control device 10. In this case, any piece of related information may be selected, and related information corresponding to the number of pieces of related content may be selected. For example, the related information having the largest number of pieces of related content may be selected, and the related information having the smallest number of pieces of related content may be selected.

FIG. 9 is a diagram showing an example of a screen in which a display is controlled after related information is selected. For example, as shown in FIG. 9, in the case where a position specified by a user comes close to a position of the object B2, the related information selection part 113 may confirm the selection of the related information. Let us assume that the display controller 111 switches, in response to a switching operation, a display target to another display target, and after performing control such that content C23 is displayed, content C22 is controlled so that it is displayed in a size larger than a predetermined size.

In this case, the content group acquisition part 114 may use the content C22 as the second selection content E2 to acquire the content group G3 related to the second selection content E2. In the display screen 141 shown in FIG. 9, among the content group G3, content C31 and content C32 are displayed, to which the display can be switched from the content C22 serving as the current display target. As an example, the selection of related information may be performed in this way.

FIG. 10 is a diagram showing a second example of a screen for selecting related information. The display controller 111 displays the display screen 141 shown in FIG. 10. In the display screen 141 shown in FIG. 10, in addition to the content C11 and the objects B1 to B3 serving as the current display targets, among the content group G1, content C10 and content C12 are displayed to which the display can be switched from the content C11 serving as the current display target.

Here, for example, in the case where a drag operation is performed by a user as an example of an operation for selecting related information, when there is the object B1 on the straight line specified by the drag operation (or, when there is the object B1 in proximity to the straight line specified by the drag operation performed by the user), the related information selection part 113 may select related information "Person" corresponding to the object B1.

FIG. 11 is a diagram showing a third example of a screen for selecting related information. As shown in FIG. 11, let us assume that the display controller 111 performs control such that the content C11 included in the content group G1 is displayed. Here, when some kind of user operation (for example, touch operation) is performed, objects corresponding to a plurality of pieces of related information, respectively, are displayed in the same manner as the example shown in FIG. 6. In addition, before performing control such that the content group G2 is displayed, the display controller 111 performs control such that a part of the content group G2 is displayed, and the related information selection part 113 may select related information when the part is selected.

In the example shown in FIG. 11, the display controller 111 performs control such that content T1 corresponding to a part of the content group that corresponds to the related information "Person" is displayed at a position matching the object B1. In the same manner, the display controller 111 performs control such that content T2 corresponding to a part of the content group that corresponds to the related information "Event" is displayed at a position matching the object B2. Further, the display controller 111 performs control such that content T3 corresponding to a part of the content group that corresponds to the related information "Place" is displayed at a position matching the object B3.

In this way, if a part of the content group G2 is displayed in advance before selecting related information, a user can select desired related information while referring to the part. Note that number of pieces of content corresponding to a part of the content group G2 may be one for each piece of related information, or may be two or more. Further, among the content group G2, although which pieces of content are to be the part of the content group G2 is not limited, the part of the content group G2 may be content to which the display can be switched intuitively from the content serving as the current display target.

FIG. 12 is a diagram showing an example of a technique for returning a display state to a normal display state. Let us assume that, after related information is selected, display targets are switched among the content group G2 corresponding to the related information, the display screen 141 as shown in FIG. 12 is displayed. In the display screen 141 shown in FIG. 12, among the content group G3, content C31 and content C32 are displayed, to which the display can be switched from the content C22 serving as the current display target.

In the state in which the display screen 141 shown in FIG. 12 is displayed, when the content C22 is selected by a touch operation, the display controller 111 returns the display contents of the display screen 141 to a normal display state of the content C22. FIG. 13 is a diagram showing an example of a screen whose display is controlled after a display state is returned to a normal display state. As shown in FIG. 13, the display controller 111 can return the state to the normal display state of the selected content C22.

Heretofore, the detail of functions of the display control device 10 according to an embodiment of the present disclosure has been described.

(1-5. Display Restriction on Pieces of Similar Content)

Here, as described above, the pieces of content in the content group G2 related to the first selection content E1 are sequentially displayed, and in the case where similar content that is in a similarity relationship with the first selection content E1 is present in the content group G2 and when the similar content is displayed, a user may not quite feel pleasure. Accordingly, the display controller 111 may impose a predetermined restriction on the display of the similar content. The predetermined restriction imposed on the display of the similar content may be any restriction.

FIG. 14 is a diagram illustrating display restriction on pieces of similar content. As shown in FIG. 14, let us assume that a content group related to an event E1 and a content group related to an event E2, the event E2 being identical to or similar to the event E1, are included in a content group having pieces of content whose display order is determined in accordance with the first standard. Content included in the content group related to the event E1 is serving as a current display target.

In this case, the display controller 111 may determine that pieces of content in the content group related to the event E1 are similar to pieces of content in the content group related to the event E2, and may lower the display order of such similar content in the content group G2 (or, such similar content may be prohibited from being displayed in the content group G2). The display of the similar content is restricted in this way, thus, the display order of another piece of content is raised, and in this way, it is expected that the pleasure for the user is increased.

Whether there is a similarity relationship between the first selection content E1 and content included in the content group G2 may be determined based on whether there is similarity relationships between related information of the first selection content E1 and related information of the content included in the content group G2. For example, in the case of pieces of related information (for example, shooting time), when the pieces of related information are within a predetermined similarity range, the display controller 111 may determine that the first selection content E1 and the content included in the content group G2 are similar to each other.

Alternatively, in the case where the display orders are within a predetermined similarity range, the display controller 111 may determine that the first selection content E1 and the content included in the content group G2 are similar to each other. Further, in the case where the first selection content E1 and the content included in the content group G2 are analyzed and the analysis results thereof are within a predetermined similarity range, the display controller 111 may determine that the first selection content E1 and the content included in the content group G2 are similar to each other.

FIG. 15 is a diagram showing an example of a screen in which display restriction is imposed on pieces of similar content. As shown in FIG. 15, the display controller 111 may perform control such that, among pieces of content included in the content group G2, the pieces of content that are similar to the first selection content E1 are displayed in a piled state as a content group R. On the other hand, in the case where a user wants to view the pieces of similar content, the content group R can be released by a predetermined release operation performed by the user.

FIG. 16 is a diagram showing an example of a screen in which display restriction on pieces of similar content is released. As shown in FIG. 16, the display controller 111 can release the content group R by a predetermined release operation performed by the user. The predetermined release operation is not particularly limited, and for example, in the case where a release button L is displayed on the display screen 141, the release operation can be realized by a touch operation on the release button L performed by the user.

Heretofore, the display restriction imposed on pieces of similar content performed by the display control device 10 according to an embodiment of the present disclosure has been described.

(1-6. Redisplay of Content)

Here, although a user can switch a display target to another display target in the display order as shown in FIG. 3, there may also be a case where the user wants to redisplay content that has been displayed once. Taking such a case into consideration, the display controller 111 may be capable of redisplaying content that has been displayed once.

FIG. 17 is a diagram illustrating redisplay of content that was displayed a predetermined number of pieces of content before currently displayed content. As shown in FIG. 17, in the case where an operation for returning to content displayed a predetermined number of pieces of content before the currently displayed content, the display controller 111 may perform control such that the content displayed a predetermined number of pieces of content before the currently displayed content is displayed again. In FIG. 17, an example in which control is performed such that the content displayed one piece of content before the currently displayed content is redisplayed. However, the predetermined number is not limited to one. Further, the operation for returning to content displayed a predetermined number of pieces of content before the currently displayed content may be realized with any operation.

FIG. 18 is a diagram illustrating an example of a screen for redisplay of content that was displayed a predetermined number of pieces of content before currently displayed content. As shown in FIG. 18, an object K may be displayed on the display screen 141, the object K being for returning to content displayed a predetermined number of pieces of content before the currently displayed content. In this case, the operation for returning to content displayed a predetermined number of pieces of content before the currently displayed content may be realized with a touch operation on the object K performed by the user. Further, as shown in FIG. 18, the object K may be an object indicating a direction of a switching operation from content that is a current display target to content that is a display target a predetermined number of pieces of content before the currently displayed content.

Further, the user may want to display again past selection content (for example, first selection content E1 to fourth selection content E4). Accordingly, in the case where an operation for returning to the first selection content E1 is performed, the display controller 111 may perform control such that the first selection content E1 is displayed again. In the same manner, in the case where an operation for returning to selection content (for example, the second selection content E2 to the fourth selection content E4) is performed, the display controller 111 may perform control such that the selection content is displayed again. The operation for returning to the selection content may be realized with any operation.

FIG. 19 is a diagram illustrating a first example of a screen for redisplay of selection content. As shown in FIG. 19, an object P for returning to selection content may be displayed on the display screen 141. In this case, in the case where a list of pieces of content that have been selected by a touch operation on the object P performed by the user in the past is displayed as a history, the operation for returning to selection content may be realized with the touch operation on selection content within the history.

FIG. 20 is a diagram illustrating a second example of a screen for redisplay of selection content. As shown in FIG. 20, pieces of past selection content (in the example shown in FIG. 20, first selection content E1 to fourth selection content E4) may be displayed in a form of being added to the content group of display targets (in the example shown in FIG. 20, content C61 and content C62). In this case, the operation for returning to selection content may be realized with the touch operation on any one of the pieces of past selection content.

FIG. 21 is a diagram illustrating a third example of a screen for redisplay of selection content. As shown in FIG. 21, past selection content (in the example shown in FIG. 21, recently selected fourth selection content E4) may be displayed in a form other than the form of being added to the content group of display targets (in the example shown in FIG. 21, content C61 and content C62). In this case, the operation for returning to selection content may be realized with the touch operation on past selection content. Note that, although the recently selected fourth selection content E4 is displayed in the example shown in FIG. 21, the selection content to be displayed is not limited to recently selected content.

Heretofore, the redisplay of content performed by the display control device 10 according to an embodiment of the present disclosure has been described.

(1-7. Selection of Item within Content)

Heretofore, the description has been mainly made of the case where a content group related to selection content is displayed. However, there is also assumed a case where an item is shown in selection content. In this case, it is also assumed that the pleasure for a user is increased if a content group corresponding to an item recognized from the selection content is displayed. For example, the content selection part 112 may select an item recognized from first selection content, and the content group acquisition part 114 may acquire a second content group using information related to the item as related information.

FIG. 22 is a diagram showing an example of a screen for selecting an item recognized from selection content. For example, let us assume a case where a face region J corresponding to an example of an item is recognized from content C72 serving as a current display target. In this case, with an operation of selecting the face region J, a content group is acquired using, as related information, information related to the face region J (for example, information related to a person to which the face belongs). In FIG. 22, content C81 is displayed as an example of the content group.

Heretofore, there has been described the selection of an item within content performed by the display control device 10 according to an embodiment of the present disclosure.

(1-8. Example of Operation Performed by Display Control Device)

Next, an example of operation of the display control device 10 according to an embodiment of the present disclosure will be described. FIG. 23 is a diagram showing an example of operation performed by a display control device according to an embodiment of the present disclosure. As shown in FIG. 23, the display controller 111 performs control such that a first content group is displayed in accordance with a first standard (S1). The display of pieces of content in the first content group is performed sequentially based on display order determined in accordance with the first standard. The content selection part 112 selects first selection content from the first content group (S2).

Next, the related information selection part 113 selects related information (S3), and the content group acquisition part 114 acquires a second content group based on the related information (S4). The display controller 111 performs control such that the second content group is displayed in accordance with a second standard that is different from the first standard (S5). The display of pieces of content in the second content group is performed sequentially based on display order determined in accordance with the second standard. The content selection part 112 selects second selection content from the second content group (S6).

The content group acquisition part 114 acquires a third content group related to the second selection content (S7). The display controller 111 performs control such that the third content group is displayed in accordance with the first standard (S8). Subsequently, the content selection part 112 selects third selection content from the third content group, which is performed in the same manner as the operation of selecting the first selection content from the first content group.

Heretofore, the example of operation performed by the display control device 10 according to an embodiment of the present disclosure has been described.

(1-9. Hardware Configuration Example)

Next, a hardware configuration example of the display control device 10 will be described. FIG. 24 is a diagram showing a hardware configuration example of the display control device 10 according to an embodiment of the present disclosure. However, the hardware configuration example shown in FIG. 24 is merely an example of the hardware configuration of the display control device 10. Accordingly, the hardware configuration of the display control device 10 is not limited to the example shown in FIG. 24. Note that, hereinafter, the description will be continued mainly assuming the case in which the display control device 10 according to the present embodiment is, for example, a highly-functional mobile phone terminal or tablet terminal having a touch panel on a display panel.

In the example shown in FIG. 24, a communication antenna 901 is a built-in antenna, for example, and performs transmission/reception of a telephone call and an e-mail through a mobile phone network and a public radio communication network, downloading of various application programs including the display control program according to the present embodiment, and transmission/reception of signal waves for communicating with the Internet or the like.

An antenna circuit 902 includes an antenna changer, a matching circuit, a filter circuit, and the like, and a transmission/reception circuit part 903 performs frequency conversion, modulation/demodulation, and the like of signals transmitted and received through the mobile phone network and the public radio communication network. A speaker 915 is a speaker provided to the display control device 10 according to the present embodiment, and is used for music playback, receiver sound output, and ringtone output, for example. A microphone 916 is used for collecting external sound, transmitter sound, and the like.

An audio signal processing part 914 includes an amplification circuit for the speaker 915, an amplification circuit for the microphone 916, an expansion-decoding circuit for expansion-decoding compression-coded audio data supplied from a control/calculation part 904, a digital/analog converter circuit for converting the expansion-decoded digital audio data into an analog audio signal, an analog/digital converter circuit for converting an analog audio signal input from the microphone 916 into a digital audio data, a compression-coding circuit for compression-coding the digital audio data, and the like.

A video signal processing part 911 includes an expansion-decoding circuit for expansion-decoding compression-coded video data supplied from the control/calculation part 904, a display panel drive circuit for causing digital video after the expansion-decoding and digital broadcasting video received by a digital broadcast reception module 909, which will be described later, to be displayed on a display panel 912, and the like. Further, in the case of the present embodiment, the video signal processing part 911 generates video signals for displaying a desktop image, various menu images, a virtual touch area image compatible with a position on a touch panel, which are supplied from the control/calculation part 904, and causes those images to be displayed on the display panel 912.

A key operation part 919 includes hard keys provided on a casing of the display control device 10 according to the present embodiment, the peripheral circuit thereof, and the like. The key operation part 919 converts a hard key-pressing operation input performed by a user into an electric signal, performs amplification and analog/digital conversion on the operation input signal, and transmits the operation input data after the analog/digital conversion to the control/calculation part 904.

An external input/output terminal 918 includes, for example, a connector for connecting a cable used at the time of performing data communication through a cable, an interface circuit for external data communication, a charging terminal used at the time of charging an internal battery through a power cable, and the charging interface circuit thereof. Various application programs including a display control program of the present embodiment may be acquired through the external input/output terminal 918.

Further, the external memory I/F 910 includes a slot for external memory to and from which a storage medium such as external memory is attached and detached, an interface circuit for external memory data communication, and the like. Various application programs including a display control program of the present embodiment may be acquired through a storage medium such as external memory inserted to the external memory I/F 910. Note that the storage medium may store a display control application program for controlling the display, which will be described later, of the display control device 10 according to the present embodiment.

A near field communication module 908 includes a communication antenna for near field radio waves such as a wireless LAN and a Bluetooth (registered trademark), and a near field communication circuit. Various application programs including a display control program of the present embodiment may be acquired through the near field communication module 908.

A digital broadcast reception module 909 includes an antenna for receiving so-called digital television broadcasting and digital radio broadcasting, and a tuner. The digital broadcast reception module 909 is not only capable of receiving one channel of digital television broadcasting, but also capable of simultaneously receiving two or more channels of digital television broadcasting. Further, the digital broadcast reception module 909 is also capable of receiving data superimposed on the digital broadcasting.

Note that, for example, after being compressed by the control/calculation part 904, the digital broadcasting data received by the digital broadcast reception module 909 can be stored (that is, recorded) in a memory part 905. Further, various application programs including a display control program according to the present embodiment may be broadcasted as one of the display broadcasting data.

A camera part 913 includes an image sensor for shooting a still image and a moving image, an optical system and the peripheral circuit thereof, and a drive circuit of a light for emitting fill light for shooting. The still image data and the moving image data at the time of shooting performed by the camera part 913 are transmitted to the video signal processing part 911 as preview video data. In this way, at the time of shooting using the camera, preview video is displayed on the display panel 912. Further, in the case of recording the still image data and the moving image data shot by the camera part 913 are to be recorded, the still image data and the moving image data that have been shot are transmitted to the control/calculation part 904 and compressed, and then stored in the memory part 905 or an external memory connected to the external memory I/F 910.

A non-contact communication module 907 performs non-contact communication through a non-contact communication antenna, the non-contact communication being used for radio frequency identification (RFID) and a non-contact IC card, for example.

A global positioning system (GPS) module 906 has a GPS antenna, and determines a latitude and a longitude of a current position of the display control device 10 by using GPS signals from GPS positioning satellites. The GPS data (information indicating latitude/longitude) obtained by the GPS module 906 is transmitted to the control/calculation part 904. In this way, the control/calculation part 904 can recognize a current position and the movement of the display control device 10.

Various sensor parts 917 include various detection sensors such as a terminal state detection sensor for detecting a state of the display control device 10 according to the present embodiment, and the peripheral circuits thereof. As the various sensor parts 917, there are given as examples a tilt sensor, an acceleration sensor, an orientation sensor, a temperature sensor, a humidity sensor, and a light intensity sensor. Detection signals obtained by the various sensor parts 917 are transmitted to the control/calculation part 904. In this way, the control/calculation part 904 can recognize states (tilt, acceleration, orientation, temperature, humidity, light intensity, and the like) of the display control device 10.

A touch panel 921 is an input operation part having a detection plane capable of detecting an operation input performed by a user, and is formed of a transparent touch sensor screen sensor provided over the entire surface of the display panel 912. A touch panel signal processing part 920 measures a touch detection position and a touch trajectory on the touch panel 921, touch duration, a touch interval, and the like, and transmits the measured data to the control/calculation part 904 as touch detection data. Note that the touch panel 921 and the touch panel signal processing part 920 support a so-called multi-touch input.

The memory part 905 includes built-in memory provided inside the display control device 10 and detachable card-type memory. As the detachable card-type memory, there is given as an example a card storing so-called subscriber identity module information (SIM). The built-in memory includes read only memory (ROM) and random access memory (RAM). The ROM stores an operating system (OS), a control program for the control/calculation part 904 to control each part, various initial setting values, dictionary data, character prediction conversion dictionary data, various types of sound data, various application programs including a display control program according to the present embodiment, and the like.

The ROM includes rewritable ROM such as NAND-type flash memory or electrically erasable programmable read-only memory (EEPROM). The ROM can save e-mail data, data of a telephone book and an e-mail address book, data of still image content and moving image content, and in addition, can save various user setting values and the like. The RAM stores data at any time, as a workspace and a buffer space for the control/calculation part 904, to perform various types of data processing.

The control/calculation part 904 includes a central processing unit (CPU), and controls each of the transmission/reception circuit part 903, the video signal processing part 911, the audio signal processing part 914, the GPS module 906, the non-contact communication module 907, the near field communication module 908, the digital broadcast reception module 909, the external memory I/F 910, the camera part 913, the various sensor parts 917, the external input/output terminal 918, the key operation part 919, the touch panel signal processing part 920, and the like, and performs various types of computing as necessary.

Further, the control/calculation part 904 executes a control program stored in the memory part 905 and various application programs including a display control program according to the present embodiment. In the case of the present embodiment, by executing the display control program, the control/calculation part 904 functions as an information allocation control part that allocates predetermined information such as letters to be described later in the respective multiple directions on a panel plane having as its approximate center a position of a user's desired operation input on the touch panel plane.

Further, in the case of the present embodiment, by executing the display control program, the control/calculation part 904 functions as an information input control part when a direction of an operation input performed by the user on the touch panel plane approximately corresponds to any one of the multiple directions, the information input control part inputting, as information selected by the user, the predetermined information allocated to the approximately corresponding direction. In addition, the display control device 10 according to the present embodiment may include structural elements that are included in a general mobile information terminal, such as a clock part for measuring time period or time, a battery for supplying each part with power, and a power management IC for controlling the power.

2. Conclusion

As described, above, according to an embodiment of the present disclosure, there can be provided a display control device, which includes an operation part configured to acquire a user operation, and a display controller configured to switch, in response to a switching operation, a display target to another display target in a first content group, display order of the display targets being determined in accordance with a first standard. The display controller switches, in response to a switching operation, a display target to another display target in a second content group corresponding to related information associated with first selection content selected from the first content group. According to such a configuration, it is possible to allow a user to view the content group and further entertain the user at the same time.

It should be understood by those skilled in the art that various modifications, combinations, sub-combinations and alterations may occur depending on design requirements and other factors insofar as they are within the scope of the appended claims or the equivalents thereof.

Further, it is also possible to create a program for causing hardware such as CPU, ROM, and RAM, which are built in a computer, to exhibit substantially the same functions as those of respective structures of the display control device 10 described above. Further, there may be also provided a computer-readable recording medium having the program recorded therein.

Additionally, the present technology may also be configured as below.

(1) An information processing system, comprising: a central processing unit configured to switch to a first selected content included in a first content group based on a first switching operation, the first content group being oriented in a first direction, and switch from the first selected content to a second selected content in a second content group based on a second switching operation, the second content group being oriented in a second direction, wherein the first content group includes content grouped according to a first standard, and the second content group includes content grouped according to a second standard different from the first standard, and the first selected content satisfies both the first standard and the second standard.

(2) The information processing system of (1), wherein when the central processing unit switches based on the first switching operation, content in the first content group is sequentially displayed until the first selected content is reached.

(3) The information processing system of any one of (1) to (2), wherein the first standard groups the content in the first content group according to time information associated with the content.

(4) The information processing system of any one of (1) to (3), wherein the central processing unit is further configured to display an indication on a displayed content that related content relating to the displayed content exists.

(5) The information processing system of (4), wherein the indication includes an indication of a switching direction to display the related content.

(6) The information processing system of (5), wherein the indication further includes an indication of an amount of related content.

(7) The information processing system of any one of (1) to (6), wherein the second standard is determined based on a user operation.

(8) The information processing system of any one of (1) to (7), wherein the central processing unit is further configured to display an object to cause redisplay of a previously displayed content, and redisplay the previously displayed content based on receipt of a user operation of the object.

(9) The information processing system of (8), wherein the object indicates a direction of the previously displayed content that is to be redisplayed.

(10) The information processing system of (9), wherein the previously displayed content to be redisplayed is a predetermined number of contents from a currently displayed content in the direction indicated by the user operation.

(11) The information processing system of any one of (8) to (10), wherein when redisplaying the previously displayed content, the central processing unit is configured to jump to the previously displayed content.

(12) The information processing system of any one of (1) to (11), wherein the central processing unit is further configured to display a history list including previously displayed content, and redisplay a selected one of the previously displayed content based on a user operation selecting the one of the previously displayed content.

(13) The information processing system of any one of (1) to (12), wherein the central processing unit is further configured to switch from the second selected content to a third selected content in a third content group based on a third switching operation, the third content group being oriented in the first direction and including content grouped according to the first standard, wherein the content in the third content group is different from the content in the first content group.

(14) The information processing system of (1), wherein the first standard relates to time information of the content.

(15) The information processing system of (14), wherein the time information of the content is at least one of a shooting time of the content or an update time of the content.

(16) The information processing system of any one of (1) to (15), wherein the second standard groups the content in accordance with a degree of similarity therebetween.

(17) The information processing system of (16), wherein the degree of similarity is calculated according to an amount of related information from the content.

(18) The information processing system of any one of (16) to (17), wherein a display order of the content in the second content group is prioritized according to the degree of similarity.

(19) An information processing method, comprising: switching to a first selected content included in a first content group based on a first switching operation, the first content group being oriented in a first direction; switch from the first selected content to a second selected content in a second content group based on a second switching operation, the second content group being oriented in a second direction, wherein the first content group includes content grouped according to a first standard, and the second content group includes content grouped according to a second standard different from the first standard, and the first selected content satisfies both the first standard and the second standard.

(20) A non-transitory computer-readable medium encoded with computer-readable instructions thereon, the computer-readable instructions when executed by a computer cause the computer to perform a method, comprising: switching to a first selected content included in a first content group based on a first switching operation, the first content group being oriented in a first direction; switch from the first selected content to a second selected content in a second content group based on a second switching operation, the second content group being oriented in a second direction, wherein the first content group includes content grouped according to a first standard, and the second content group includes content grouped according to a second standard different from the first standard, and the first selected content satisfies both the first standard and the second standard.

Additionally, the present technology may also be configured as below.

(1)

A display control device including:

an acquisition part configured to acquire an input signal generated based on an operation input performed by a user; and a display controller configured to switch, in response to a first switching operation indicating a first direction, a display target to another display target in a first content group, display order of the display targets being determined in accordance with a first standard, wherein the display controller switches, in response to a second switching operation indicating a second direction that is different from the first direction, a display target to another display target in a second content group, the second content group being specified based on related information associated with first selection content selected from the first content group.

(2)

The display control device according to (1), wherein the display controller determines display order of the display targets included in the second content group in accordance with a second standard that is different from the first standard.

(3)

The display control device according to (2), wherein the second standard is a standard for determining display order in accordance with related information associated with pieces of content that constitute the second content group.

(4)

The display control device according to (2), wherein the second standard is a standard for determining display order in accordance with a degree of similarity between an evaluation value calculated from the first selection content and an evaluation value calculated from pieces of content that constitute the second content group.

(5)

The display control device according to (1), wherein, when there are a plurality of pieces of related information associated with the first selection content, the display controller determines, in accordance with a predetermined standard, display order of a plurality of second content groups corresponding to the plurality of pieces of related information.

(6)

The display control device according to (5), wherein the predetermined standard is a standard for determining display order depending on a number of pieces of content that constitute each of the plurality of second content group.

(7)

The display control device according to (1), further including:

a content selection part configured to select, in response to a selection operation, the first selection content from the first content group; and a content group acquisition part configured to acquire the second content group based on related information associated with the first selection content.

(8)

The display control device according to (7), further including:

a related information selection part configured to select related information based on an operation for selecting the related information, wherein the content group acquisition part acquires the second content group based on the related information selected by the related information selection part.

(9)

The display control device according to (8), wherein the display controller performs control in a manner that a part of the second content group is displayed before performing control in a manner that the second content group is displayed, and wherein, when the part is selected, the related information selection part selects the related information.

(10)

The display control device according to (1), wherein, when an operation for returning to the first selection content is performed, the display controller performs control in a manner that the first selection content is redisplayed.

(11)

The display control device according to (1), wherein, when an operation for returning to content displayed a predetermined number of pieces of content before currently displayed content is performed, the display controller performs control in a manner that the content displayed the predetermined number of pieces of content before the currently displayed content is redisplayed.

(12)

The display control device according to (1), wherein, when control is performed in a manner that any one of pieces of content that constitute the first content group is displayed, in a case where content related to the one piece of content is present, the display controller performs control in a manner that presence of the content related to the one piece of content is displayed.

(13)

The display control device according to (1), wherein, when similar content that is in a similarity relationship with the first selection content is present in the second content group, the display controller imposes a predetermined restriction on a display of the similar content.

(14)

The display control device according to (7), wherein the content selection part selects an item recognized from the first selection content, and wherein the content group acquisition part acquires the second content group using, as the related information, information related to the item.

(15)

The display control device according to (7), wherein the content group acquisition part acquires, as the second content group, a content group including pieces of content each associated with related information that is identical to or similar to related information associated with the first selection content.

(16)

The display control device according to (1), wherein the display controller switches, in response to a switching operation, a display target to another display target in the second content group and switches, in response to a switching operation, a display target to another display target in a third content group corresponding to related information associated with second selection content selected from the second content group.

(17)

The display control device according to (16), wherein the display controller determines display order of display targets included in the third content group in accordance with the first standard.

(18)

A display control method including:

acquiring an input signal generated based on an operation input performed by a user; switching, in response to a first switching operation indicating a first direction, a display target to another display target in a first content group, display order of the display targets being determined in accordance with a first standard; and switching, in response to a second switching operation indicating a second direction that is different from the first direction, a display target to another display target in a second content group, the second content group being specified based on related information associated with first selection content selected from the first content group.

(19)

A computer-readable recording medium having a program recorded thereon, the program causing a computer to function as a display control device including an acquisition part configured to acquire an input signal generated based on an operation input performed by a user, and a display controller configured to switch, in response to a first switching operation indicating a first direction, a display target to another display target in a first content group, display order of the display targets being determined in accordance with a first standard, wherein the display controller switches, in response to a second switching operation indicating a second direction that is different from the first direction, a display target to another display target in a second content group, the second content group being specified based on related information associated with first selection content selected from the first content group.

REFERENCE SIGNS LIST 10 display control device
110 controller
111 display controller
112 content selection part
113 related information selection part
114 content group acquisition part
120 operation part
130 storage
140 display part

The invention claimed is:

1. An information processing system, comprising:

a central processing unit configured to:

control a display screen to switch to a first selected content included in a first content group based on a first switching operation, wherein the first content group is oriented in a first direction;

switch the display screen from the first selected content to a second selected content in a second content group based on a second switching operation, wherein the second content group is oriented in a second direction, wherein the first content group includes a first set of content that is grouped based on a first standard, and the second content group includes a second set of content that is grouped based on a second standard different from the first standard, and wherein the first selected content satisfies both the first standard and the second standard;

determine a display order for display of one of the first set of content or the second set of content, wherein the display order for the second set of content is determined based on a number of content items in the second content group; and sequentially display at least one of the first set of content or the second set of content in the determined display order based on at least one of the first switching operation or the second switching operation.

2. The information processing system according to claim 1, wherein the central processing unit is further configured to, based on the first switching operation, sequentially display content in the first content group until the first selected content is reached.

3. The information processing system according to claim 2, wherein the central processing unit is further configured to use the first standard to group the first set of content in the first content group based on time information associated with the first set of content.

4. The information processing system according to claim 1, wherein the central processing unit is further configured to display an indication on a displayed content that related content that relates to the displayed content exists.

5. The information processing system according to claim 4, wherein the indication includes a first indication of a switching direction to display the related content.

6. The information processing system according to claim 5, wherein the indication further includes a second indication of an amount of the related content.

7. The information processing system according to claim 1, wherein the second standard is determined based on a user operation.

8. The information processing system according to claim 1, wherein the central processing unit is further configured to:

display an object to cause redisplay of a previously displayed content; and redisplay the previously displayed content based on receipt of a user operation with respect to the object.

9. The information processing system according to claim 8, wherein the object indicates a direction of the previously displayed content that is to be redisplayed.

10. The information processing system according to claim 9, wherein the previously displayed content to be redisplayed is a determined number of contents from a currently displayed content in the direction indicated by the user operation.

11. The information processing system according to claim 8, wherein based on redisplay of the previously displayed content, the central processing unit is further configured to jump to the previously displayed content.

12. The information processing system according to claim 1, wherein the central processing unit is further configured to:

display a history list including previously displayed content; and redisplay one of the previously displayed content based on a user operation that selects the one of the previously displayed content.

13. The information processing system according to claim 1, wherein the central processing unit is further configured to switch from the second selected content to a third selected content in a third content group based on a third switching operation, wherein the third content group is oriented in the first direction and includes a third set of content grouped based on the first standard, and wherein the third selected content in the third content group is different from the first selected content in the first content group.

14. The information processing system according to claim 1, wherein the first standard relates to time information of the first set of content.

15. The information processing system according to claim 14, wherein the time information of the first set of content is at least one of a shooting time of each of the first set of content or an update time of each of the first set of content.

16. The information processing system according to claim 1, wherein the central processing unit is further configured to use the second standard to group the second set of content based on a degree of similarity among the second set of content.

17. The information processing system according to claim 16, wherein the central processing unit is further configured to calculate the degree of similarity based on an amount of related information from the second set of content.

18. The information processing system according to claim 16, wherein the central processing unit is further configured to prioritize the display order of the second set of content in the second content group based on the degree of similarity.

19. An information processing method, comprising:

controlling a display screen to switch to a first selected content included in a first content group based on a first switching operation, wherein the first content group is oriented in a first direction; and switching the display screen from the first selected content to a second selected content in a second content group based on a second switching operation, wherein the second content group is oriented in a second direction, wherein the first content group includes a first set of content that is grouped based on a first standard, and the second content group includes a second set of content that is grouped based on a second standard different from the first standard, and wherein the first selected content satisfies both the first standard and the second standard;

determining a display order for display of one of the first set of content or the second set of content, wherein the display order for the second set of content is determined based on a number of content items in the second content group; and sequentially displaying at least one of the first set of content or the second set of content in the determined display order based on at least one of the first switching operation or the second switching operation.

20. A non-transitory computer-readable storage medium having stored thereon, computer-executable instructions, which when executed by a computer, cause the computer to execute operations, the operations comprising:
- controlling a display screen to switch to a first selected content included in a first content group based on a first switching operation, wherein the first content group is oriented in a first direction; and
- switching the display screen from the first selected content to a second selected content in a second content group based on a second switching operation, wherein the second content group is oriented in a second direction,
- wherein the first content group includes a first set of content that is grouped based on a first standard, and the second content group includes a second set of content that is grouped based on a second standard different from the first standard, and wherein the first selected content satisfies both the first standard and the second standard;
- determining a display order for display of one of the first set of content or the second set of content, wherein the display order for the second set of content is determined based on a number of content items in the second content group; and
- sequentially displaying at least one of the first set of content or the second set of content in the determined display order based on at least one of the first switching operation or the second switching operation.

* * * * *